US007356026B2

(12) United States Patent
Scott et al.

(10) Patent No.: US 7,356,026 B2
(45) Date of Patent: *Apr. 8, 2008

(54) NODE TRANSLATION AND PROTECTION IN A CLUSTERED MULTIPROCESSOR SYSTEM

(75) Inventors: Steven L. Scott, Eau Claire, WI (US); Chris Dickson, Apple Valley, MN (US); Steve Reinhardt, Eagan, MN (US)

(73) Assignee: Silicon Graphics, Inc., Sunnyvale, CA (US)

( * ) Notice: Subject to any disclaimer, the term of this patent is extended or adjusted under 35 U.S.C. 154(b) by 848 days.

This patent is subject to a terminal disclaimer.

(21) Appl. No.: 10/020,854

(22) Filed: Dec. 14, 2001

(65) Prior Publication Data

US 2002/0172199 A1 Nov. 21, 2002

(51) Int. Cl.
*G06F 12/00* (2006.01)
(52) U.S. Cl. .................. 370/389; 370/395.3; 370/401; 370/395.54; 711/207; 711/202; 711/205
(58) Field of Classification Search ................ 370/389, 370/400, 401, 395.54, 475, 395.3; 711/207, 711/202, 205
See application file for complete search history.

(56) References Cited

U.S. PATENT DOCUMENTS

| | | | |
|---|---|---|---|
| 4,894,822 A * | 1/1990 | Buhrke et al. | 370/400 |
| 5,239,643 A * | 8/1993 | Blount et al. | 707/102 |
| 5,430,850 A | 7/1995 | Papadopoulos et al. | 709/314 |
| 5,446,915 A | 8/1995 | Pierce | 712/11 |
| 5,463,621 A * | 10/1995 | Suzuki | 370/399 |
| 5,560,029 A | 9/1996 | Papadopoulos et al. | 712/25 |

(Continued)

OTHER PUBLICATIONS

Behling, S R., et al., "Recent experience with STAR-HPC on the CRAY T3E", *High Performance Computing in Automotive Design, Engineering, and Manufacturing : Proceedings of the 3rd International Conference on High Performance Computing in the Automotive Industry*, Eagan, Minn. : Cray Research, Inc., (1997), 377-384.

(Continued)

*Primary Examiner*—Edan Orgad
*Assistant Examiner*—Venkatesh Haliyur
(74) *Attorney, Agent, or Firm*—Schwegman, Lundberg & Woessner, P.A.

(57) ABSTRACT

A method of node translation for communicating over virtual channels in a clustered multiprocessor system using connection descriptors (CDs), which specify the endpoint nodes for virtual connections. The system includes a local processing element node, a remote processing element node and a network interconnect therebetween for sending communications between the processing element nodes. The method includes assigning a CD to specify an endpoint node for a virtual connection, defining a local connection table (LCT) to be accessed with the CD to produce a system node identifier (SNID) of the endpoint node, generating a communication request including the CD, accessing the LCT using the CD of that communication request to produce the SNID for the endpoint node of the connection in response to that request, and sending a memory request to the endpoint node. The memory request is sent to the local processing element node if the endpoint node is the local processing element node, and is sent over the network interconnect to the remote processing element node if the endpoint node is the remote processing element node.

27 Claims, 8 Drawing Sheets

U.S. PATENT DOCUMENTS

| | | | | |
|---|---|---|---|---|
| 5,574,939 | A | * | 11/1996 | Keckler et al. ............... 712/24 |
| 5,649,141 | A | * | 7/1997 | Yamazaki .................. 711/206 |
| 5,740,171 | A | * | 4/1998 | Mazzola et al. ........... 370/392 |
| 5,860,146 | A | | 1/1999 | Vishin et al. ............... 711/207 |
| 5,895,503 | A | * | 4/1999 | Belgard ...................... 711/202 |
| 5,897,664 | A | | 4/1999 | Nesheim et al. ........... 711/206 |
| 6,003,123 | A | | 12/1999 | Carter et al. ............... 711/207 |
| 6,112,285 | A | | 8/2000 | Ganapathy et al. ........ 711/207 |
| 6,321,276 | B1 | * | 11/2001 | Forin ............................ 710/3 |
| 6,535,507 | B1 | * | 3/2003 | Li et al. ..................... 370/356 |
| 6,665,730 | B1 | * | 12/2003 | Michelson et al. ......... 709/238 |
| 6,671,791 | B1 | * | 12/2003 | McGrath .................... 711/206 |
| 6,706,820 | B2 | * | 3/2004 | Kumaki et al. ............. 525/213 |
| 6,807,617 | B2 | * | 10/2004 | McGrath .................... 711/208 |
| 6,856,619 | B1 | * | 2/2005 | Haugseth et al. ........... 370/389 |
| 6,925,547 | B2 | | 8/2005 | Scott et al. |
| 7,003,574 | B1 | * | 2/2006 | Bahl .......................... 709/228 |

OTHER PUBLICATIONS

Hennessy, John L., "Computer Organization and Design - The Hardware/Software Interface", *Virtual Memory,* (1998), 593.

Kuskin, Jeffrey, et al., "The Standford FLASH Multiprocessor", http://www-flash.standford.edu/architecture/papers/ISCA94/, (Jun. 6, 1996), 21 pgs.

Prylli, Loic , et al., "An improved NIC program for high-performance MPI", *Workshop on Cluster-Based Computing. Internaitonal Conference on Supercomputing,* Rhodes, Greece, (Jun. 1999), 26-30.

Non-final office action mailed Dec. 19, 2003, in U.S. Appl. No. 10-017488, 5 pgs.

Non-final office action mailed Mar. 14, 2005, in U.S. Appl. No. 10-017488, 5 pgs.

Non-final office action mailed Jun. 23, 2004, in U.S. Appl. No. 10-017488, 5 pgs.

Response filed Mar. 19, 2004 to non-final office action mailed Dec. 19, 2003 in U.S. Appl. No. 10-017488, 18 pgs.

* cited by examiner

NODE TRANSLATION AND PROTECTION IN A CLUSTERED MULTIPROCESSOR SYSTEM

CROSS-REFERENCES TO RELATED INVENTIONS

The present invention is related to the following application, which is filed on even date herewith, and which is incorporated herein by reference:

U.S. patent application Ser. No. 10/017,488 (now U.S. Pat. No. 6,925,547), filed Dec. 14, 2001, entitled "REMOTE ADDRESS TRANSLATION IN A MULTIPROCESSOR SYSTEM".

FIELD OF THE INVENTION

The present invention generally relates to the field of high-speed digital data processing systems and, more particularly, relates to a mechanism for node translation and protection for communicating over virtual channels in a clustered multiprocessor system.

BACKGROUND

Multiprocessor computer systems comprise a number of processing element nodes connected together by an interconnect network. Typically, each processing element node includes at least one processor, a local memory, and an interface circuit connecting the processing element node to the interconnect network. The interconnect network is used for transmitting packets of information or messages between the processing element nodes.

Distributed shared memory multiprocessor systems include a number of processing element nodes which share a distributed memory and are located within a single machine. By increasing the number of processing element nodes, or the number of processors within each node, such systems can often be scaled to handle increased demand. In such a system, each processor can directly access all of memory, including its own local memory and the memory of the other (remote) processing element nodes. Typically, the virtual address used for all memory accesses within a distributed shared memory multiprocessor system is translated to a physical address in the requesting processor's translation-lookaside buffer ("TLB"). Thus, the requesting processor's TLB will need to contain address translation information for all of the memory that the processor accesses within the machine, which includes both local and remote memory. This amount of address translation information can be substantial, and can result in much duplication of translation information throughout the multiprocessor system (e.g., if the same page of memory is accessed by 64 different processors, the TLB used by each processor will need to contain an entry for that page).

Some multiprocessor systems employ block transfer engines to transfer blocks of data from one area of memory to another area of memory. Block transfer engines provide several advantages, such as asynchronous operation (i.e., by operating without further processor involvement after being initially kicked off by the processor, block transfer engines free up the processor to perform other tasks) and faster transfer performance than could be achieved by the processor (e.g., since block transfer engines do not use processor-generated cachable references, there is less overhead on the coherence protocol of the read-modify-write cycle, and cache blowouts can be avoided).

Unfortunately, existing block transfer engines suffer from problems that limit their utility. For example, since address translations are performed in on-chip TLBs at the requesting processors, external block transfer engines are prevented from being programmed using virtual addresses. Instead, with existing block transfer engines, user software makes an operating system (OS) call to inform the OS that it wants to transfer a particular length of data from a particular source (specified by its virtual address) to a particular destination (also specified by its virtual address). In response, the OS first checks whether it has address translations for all of the virtual addresses, and then generates separate block-transfer requests for each physical page. For example, if the virtual address range spans 15 physical pages, an OS may have to generate 15 separate queued block-transfer requests to cause 15 separate physical transfers. The large amount of overhead associated with such OS intervention means that much of the advantage that is associated with performing the block transfer in the first place is lost.

Clustered multiprocessor systems include collections of processing machines, with each processing machine including a single processor system or distributed shared memory multiprocessor system. Clustering advantageously limits the scaling required of a single OS, and provides fault containment if one of the machines should suffer a hardware or OS error. In a clustered system, however, memory accesses to remote machines are typically performed via a network interface I/O device that requires OS intervention to send messages, and can target only specific memory buffers that were reserved for this communication at the remote machine. Thus, memory must be specifically "registered" by a user process on the remote machine, which prevents the memory on the remote machine from being accessed arbitrarily. Also, state must be set up on the remote machine to direct the incoming data, or the OS on the remote machine must intervene to handle the data, copying the data at least once. More recently, some network interface cards have been designed to support user-level communication using the VIA, ST or similar "OS bypass" interface. Such approaches, while successful in avoiding OS intervention on communication events, do not unify local and remote memory accesses. Thus, programs must use different access mechanisms for intra-machine and inter-machine communication.

Thus, there is a need for a node translation mechanism for communicating over virtual channels in a clustered system that supports user-level communications without the need for OS intervention on communication events. There is also a need for a node translation mechanism that unifies local and remote memory accesses, thus allowing user programs to use the same access mechanisms for both intra-machine and inter-machine communications. Such a mechanism would allow communication with other nodes in a local machine to be handled in the same way as communications with nodes in remote machines. There is also a need for a node translation mechanism which supports low overhead communications in scalable, distributed memory applications that seamlessly span machine boundaries, provides protection, and supports remote address translation.

SUMMARY OF THE INVENTION

One aspect of the invention relates to a method of node translation for communicating over virtual channels in a clustered multiprocessor system using connection descriptors (CDs). The system includes local and remote processing element nodes, and a network interconnect therebetween for sending communications. The method includes assigning a CD to a virtual connection (the CD is a handle specifying an endpoint node for the virtual connection), defining a local connection table (LCT) to be accessed using the CD to produce a system node identifier (SNID) for the endpoint node, generating a communication request including the CD, accessing the LCT using the CD of that communication request to produce the SNID for the endpoint node for the connection in response to the communication request, and sending a memory request to the endpoint node. The memory request is sent to the local processing element node if the endpoint node is the local processing element node, and is sent over the network interconnect to the remote processing element node if the endpoint node is the remote processing element node.

Another aspect of the invention relates to a node translation apparatus for a clustered multiprocessor system, including a memory and communication engine (CE). The memory stores a local connection table (LCT) having a plurality of entries indexed by a connection descriptor (CD), each entry of the LCT storing a system node identifier (SNID) for the endpoint of a virtual connection. The CE receives a communication request including a CD from a user process, accesses the LCT using the CD of the communication request to produce the SNID for the endpoint node for the virtual connection, and sends a memory request to the endpoint node identified using the LCT. The memory request is sent internally to the endpoint node if the endpoint node is located within the local processing element node, and is sent over a network interconnect to the endpoint node if the endpoint node is located within the remote processing element node.

Other aspects of the invention will be apparent upon reading the following detailed description of the invention and viewing the drawings that form a part thereof.

DETAILED DESCRIPTION

In the following detailed description, reference is made to the accompanying drawings, which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural, logical and electrical changes may be made without departing from the spirit and scope of the invention. The following detailed description is, therefore, not to be taken in a limiting sense, and the scope of the present invention is defined by the appended claims and their equivalents.

Figure 1:
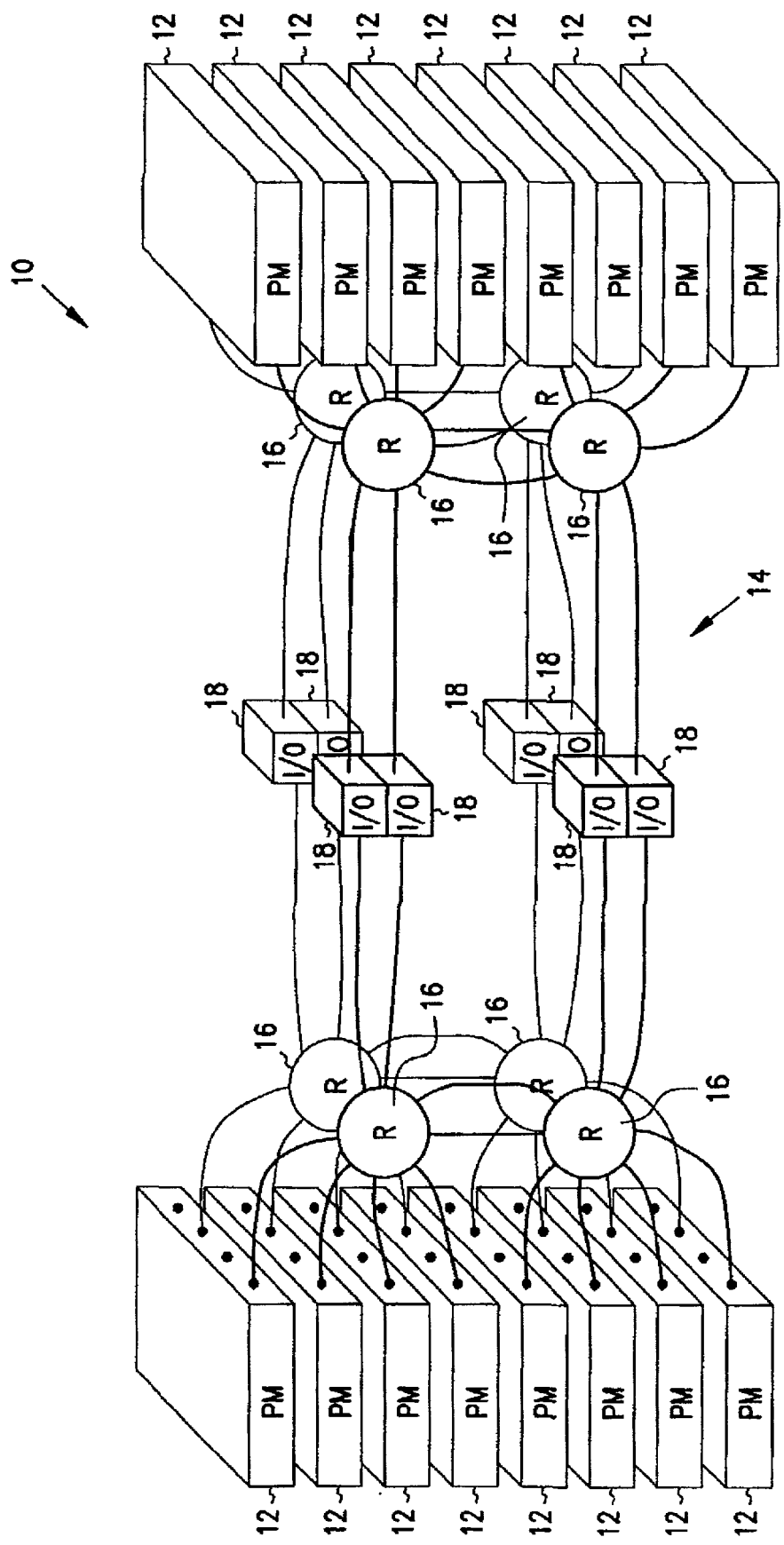
FIG. 1 is a system block diagram showing an exemplary multiprocessor system which includes a plurality of processor modules (PMs) interconnected via a network.

Referring to FIG. 1, an exemplary multiprocessor system 10 includes a plurality of processor modules (PMs) 12 interconnected by an interconnect network 14. As described further below, each PM 12 includes a combination of processors, memories and interface circuitry. Interconnect network 14 includes a plurality of routers 16, input/output (I/O) blocks 18, and communication busses or lines which interconnect PMs 12, routers 16 and I/O blocks 18, as shown. Routers 16 form system interconnects for routing messages between PMs 12. In one embodiment, I/O blocks 18 are used to provide connections between the routers 16 shown on the left side of FIG. 1 and the routers 16 shown on the right side of FIG. 1. In another embodiment, routers 16 are interconnected directly without I/O blocks 18.

Figure 2:
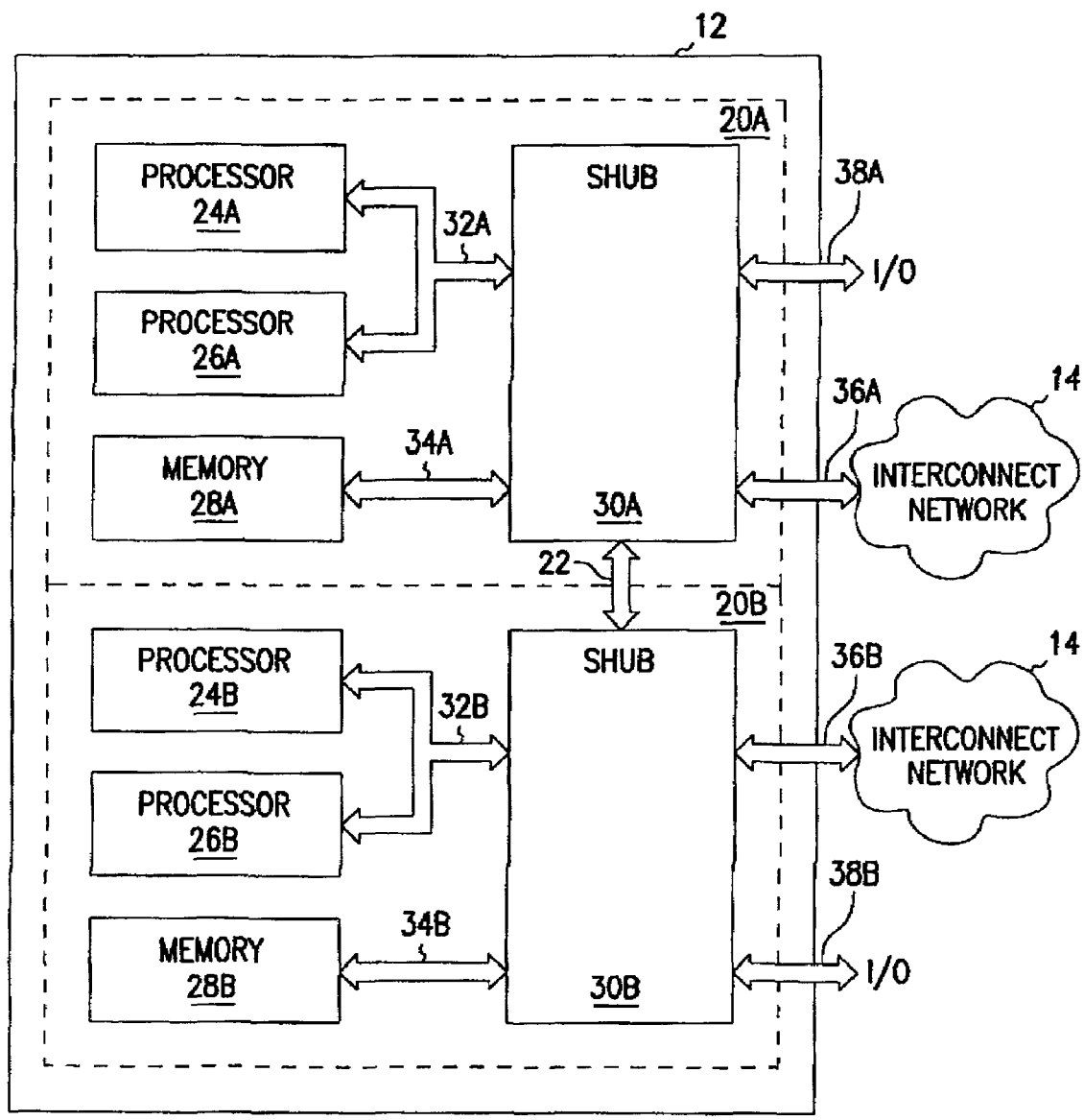
FIG. 2 is a block diagram of each PM of FIG. 1, with each PM including two nodes, and each node including a pair of processors, a local memory, and a system hub (SHUB)

Referring to FIG. 2, in one embodiment, each PM 12 includes two processing element nodes 20A and 20B interconnected by an internal communication bus 22. Processing element node 20A includes a first processor 24A, a second processor 26A, a local memory 28A, and a system hub (SHUB) 30A. SHUB 30A is connected to processors 24A and 26A via a front-side bus 32A, to local memory 28A via a memory bus 34A, and to interconnect network 14 via a network bus 36A. SHUB 30A can also communicate externally via an I/O bus 38A. Similarly, processing element node 20B includes a first processor 24B, a second processor 26B, a local memory 28B, and a SHUB 30B. SHUB 30B is connected to processors 24B and 26B via a front-side bus 32B, to local memory 28B via a memory bus 34B, and to interconnect network 14 via a network bus 36B. SHUB 30B can also communicate externally via an I/O bus 38B. Since processing element node 20B is identical to node 20A, the remainder of this specification describes only node 20A, unless otherwise noted.

Each processor 24A and 26A of node 20A accesses local memory 28A via SHUB 30A, and accesses remote memory (i.e., the local memory of any other node of system 10) via SHUB 30A and either internal communication bus 22 and SHUB 30B (if the remote memory is local to node 20B) or interconnect network 14 and a remote SHUB (if the remote memory is on any other node of system 10). From the point of view of processor 24A or 26A, memory is simply located at an address. SHUB 30A determines if the address asserted by processor 24A or 26A should be routed locally, or globally via the network, using part of the address referred to as the "node bits". The node bits specify the system node at which the memory is located. If the node bits match the local node, a memory access is sent straight to local memory 28A. However, if the node bits match a remote node, the memory access is formatted into a network packet and is sent to the remote node via the network. The memory architecture of FIGS. 1–2 can be referred to as a non-uniform memory architecture since each of the processors has access to local memory on its local node, and also has access to remote memory on remote nodes via the routing network.

In one embodiment, processors 24A and 26A comprise high-performance scalable microprocessors such as MIPS® 32-bit or 64-bit RISC microprocessors available from MIPS Technologies, Inc. of California, which use the MIPS® architecture. In another embodiment, processors 24A and 26A comprise Itanium™ 164 processors available from the Intel Corporation of California. These processors are only exemplary, however, and it is contemplated that other types of processors may be used with the present invention.

As shown in FIGS. 1–2, multiprocessor system 10 includes 16 PMs 12, with each PM 12 including two nodes 20A and 20B, and each node containing two processors. Thus, system 10 is a 64-processor multiprocessor. It should be understood, however, that the address translation mechanism described herein can be used with other multiprocessor architectures, with different numbers of PMs, nodes per PM, and/or processors per node.

As also shown in FIGS. 1–2, aspects of system 10 can be referred to as a distributed shared memory multiprocessor system (e.g., the processing element nodes of FIG. 1 share a distributed memory and are located within a single machine). At the same time, in one embodiment, one or more processing element nodes can be placed in a first cluster, with the remaining nodes in a second cluster. It should also be understood that the address translation mechanism described herein can be used with other multi-processor systems, including other forms of distributed shared memory multiprocessor systems, and other forms of clustered multiprocessor systems. System 10 is merely an exemplary system which provides context for the address translation mechanism disclosed herein; many other forms of systems may also be used.

Figure 3:
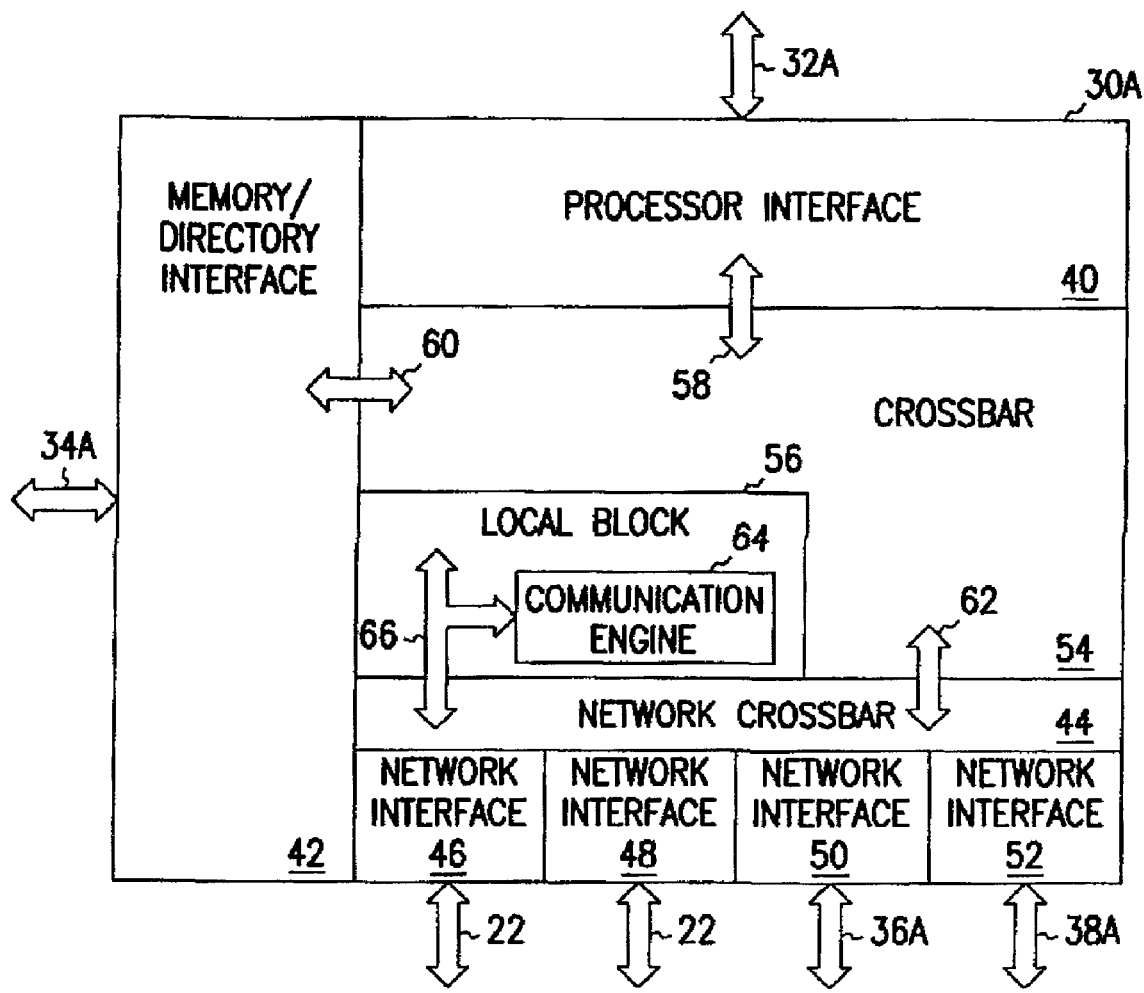
FIG. 3 is a block diagram showing various functional blocks within each SHUB shown in FIG. 2, which includes a local block containing a communication engine (CE)

Referring to FIG. 3, in one embodiment, each SHUB 30A (or 30B) includes a number of functional blocks, or "chip-lets", that may be implemented in an application-specific integrated circuit (ASIC). In particular, SHUB 30A includes a processor interface 40, a memory/directory interface 42, a network crossbar 44, network interfaces 46–52, a crossbar 54, and a local block 56. Processor interface 40 interfaces with processors 24A and 26A via front-side bus 32A, and includes coherence response buffers for interfacing with the snoop-based coherence protocol used by front-side bus 32A. A "coherence protocol" refers to a set of rules describing which processor owns data, and which processor has the right to update the data. By adhering to these rules, the integrity of the data can be guaranteed. A "coherence domain" refers to a set of processing element between which processor-generated cachable memory references are guaranteed to be globally coherent.

In one embodiment, all of the coherence information is passed across the bus in the form of messages, and each processor on the bus "snoops" by monitoring the addresses on the bus and, if it finds the address of data within its own cache, invalidating that cache entry. Other cache coherence schemes can be used as well. Memory/directory interface 42 interfaces with local memory 28A via memory bus 34A. Network crossbar 44 interfaces with the other processing element node in the same PM 12 via network interfaces 46 and 48, which connect to internal communication bus 22, and with interconnect network 14 and other I/O devices via network interfaces 50 and 52, which connect to network bus 36A and I/O bus 38A. Crossbar 54 provides internal interfaces between processor interface 40, memory/directory interface 42, and network crossbar 44 via internal busses 58, 60 and 62, respectively. Crossbar 54 monitors addresses asserted by processors 24A and 26A on front-side bus 32A, and accesses local memory 28A if the addresses are local and accesses remote memory on another node of multiprocessor system 10 if the addresses are remote. Other switching mechanisms can also be used.

Communication Engine

Each SHUB 30A (or 30B) also includes a communication engine (CE) 64 capable of performing user-level block transfers and atomic memory operations (AMOs) after being programmed to do so. In one embodiment, CE 64 is located in local block 56, and has its own port 66 on the network interface-based internal crossbar. CE 64 is capable of performing user-level block transfers and AMOs both within and between coherence domains using the same user-level software interface. In particular, CE 64 includes a plurality of memory-mapped registers (MMRs) which can be programmed by user processes running in processor 24A or 26A to perform block transfers or AMOs. CE 64 can be programmed to function as a block transfer engine to transfer blocks of data (immediate data, or data stored within a source memory buffer) by generating coherence protocol requests (i.e., "PUTs" and "GETs") that blast data into memory in a coherence snapshot without the need to first obtain a shared copy of the data. The data can be moved from local memory to local memory, from local memory to remote memory, from remote memory to local memory, and from remote memory to remote memory. CE 64 can also be programmed to perform various types of AMOs on either a local or a remote memory location. Due to the address translation mechanism described below, CE 64 can advantageously be directly programmed by user processes using virtual addresses, and can operate without operating system (OS) intervention after initial set up. CE 64 can reference local memory 28A, as well as remote memory located on a remote node in a distributed shared memory multiprocessor system, or on a remote node on another machine in a cluster. Thus, CE 64 is capable of referencing memory in the same coherence domain, or in another coherence domain of a clustered system, even if direct loads and stores across the coherence domains are not supported.

Figure 4A:
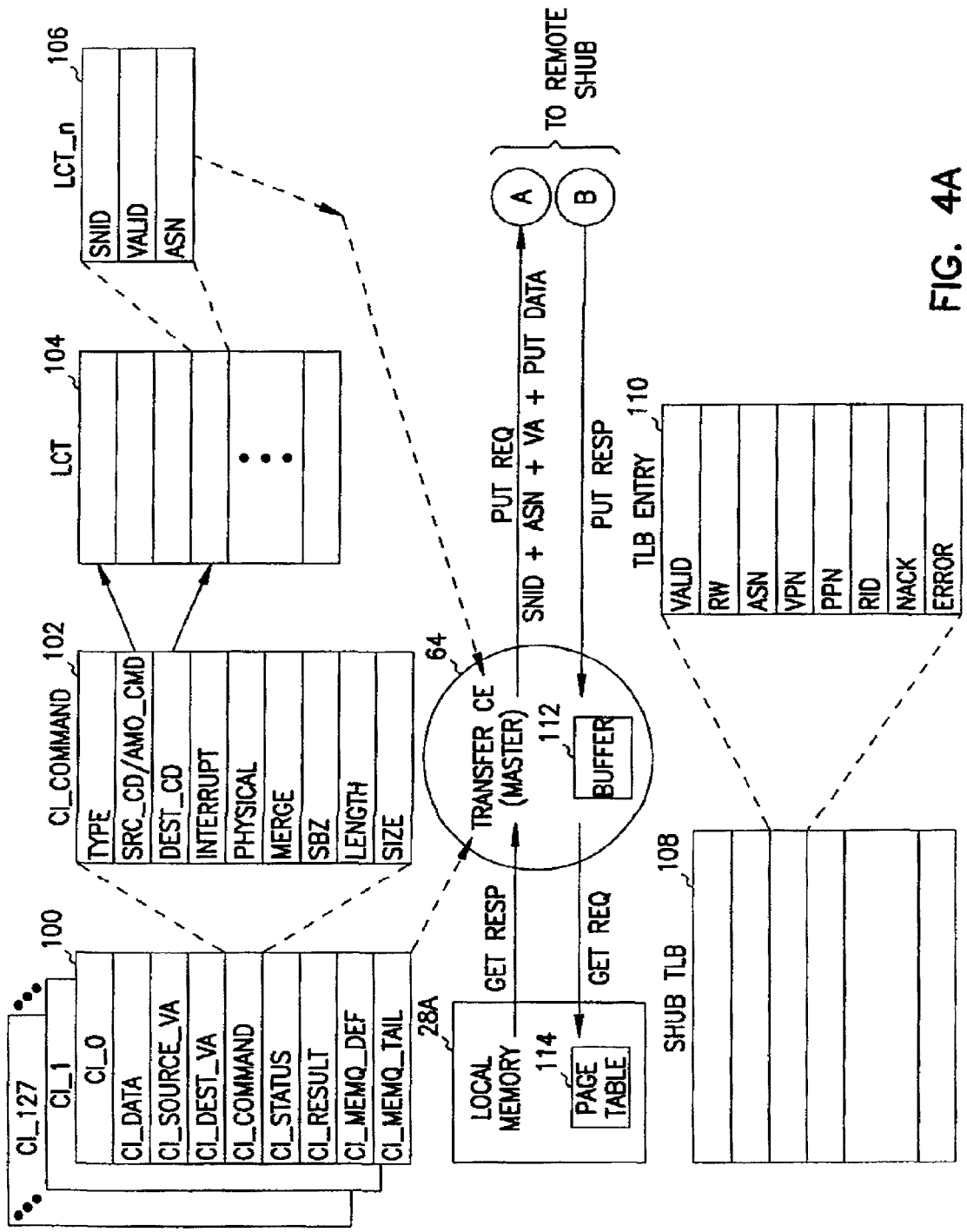
FIGS. 4A and 4B are diagrams illustrating an exemplary transfer of data performed by CEs such as that in FIG. 3, wherein data is transferred from local memory resident on a local node to target memory resident on a remote node, with FIG. 4A illustrating the transfer from the perspective of the local node (which acts as a master), and FIG. 4B illustrating the transfer from the perspective of the remote node (which acts as a slave)
Figure 4B:
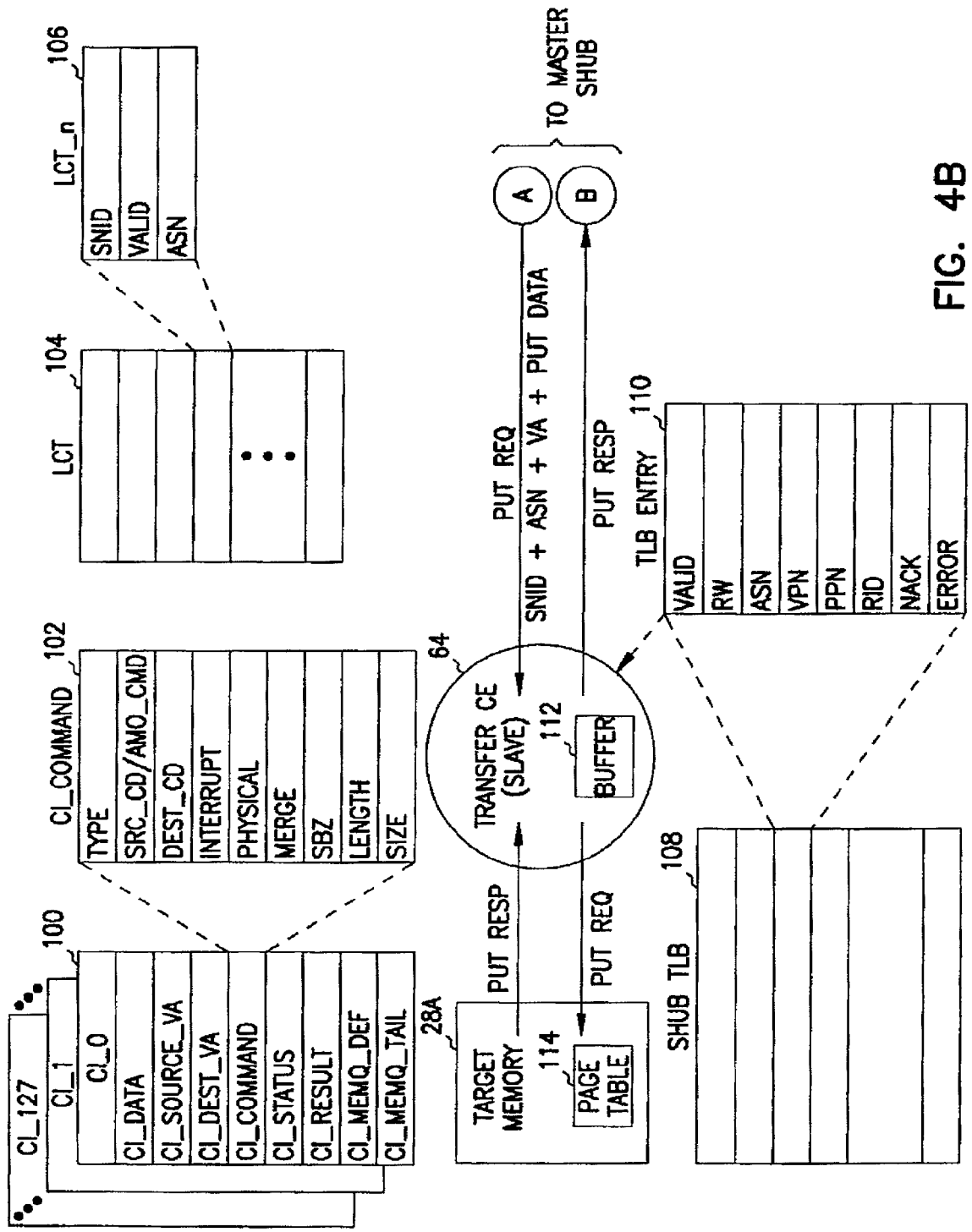
Figure 5A:
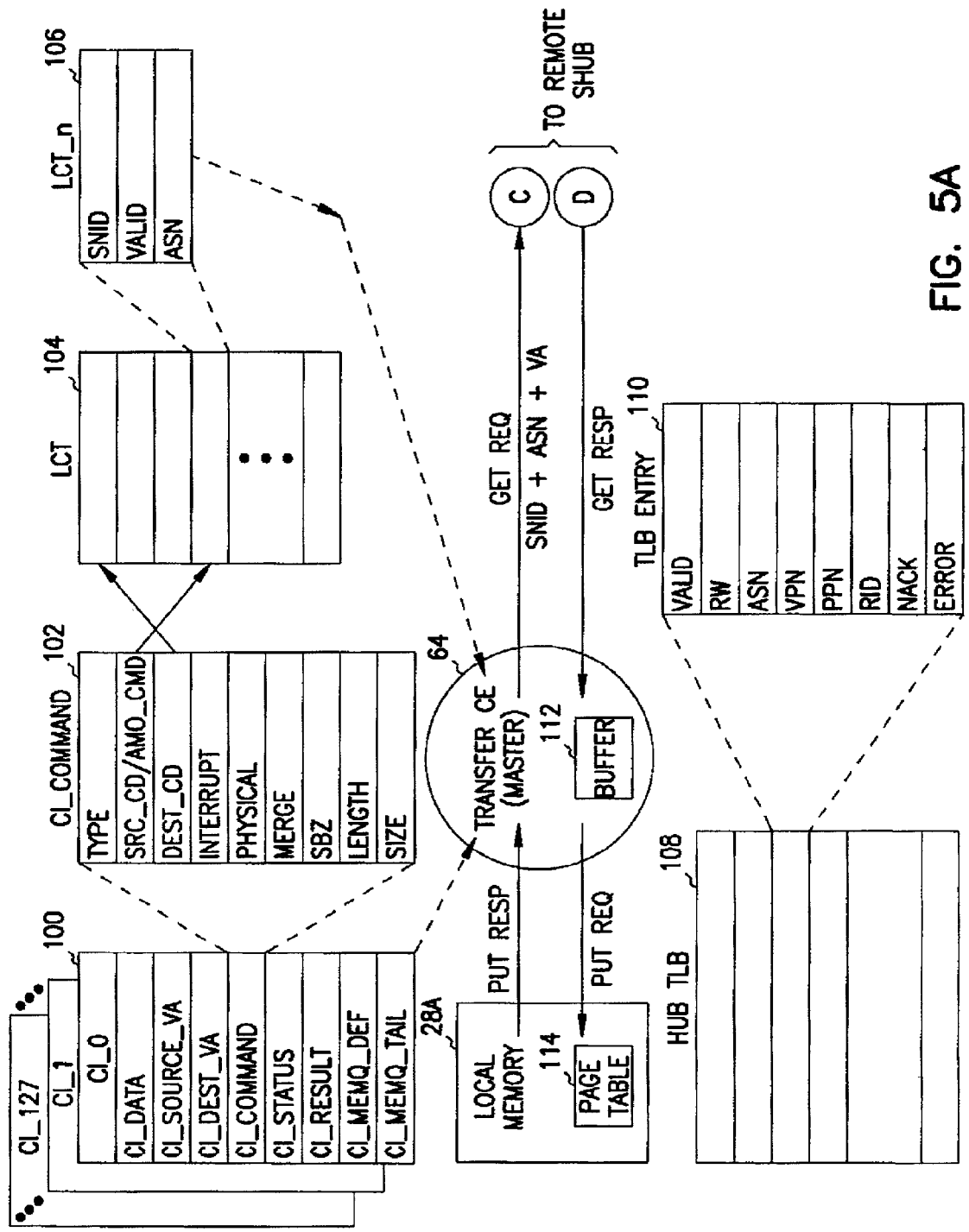
FIGS. 5A and 5B are diagrams illustrating an exemplary transfer of data performed by CEs such as that in FIG. 3, wherein data is transferred from source memory resident on a remote node to local memory resident on a local node, with FIG. 5A illustrating the transfer from the perspective of the local node (which acts as a master), and FIG. 5B illustrating the transfer from the perspective of the remote node (which acts as a slave)
Figure 5B:
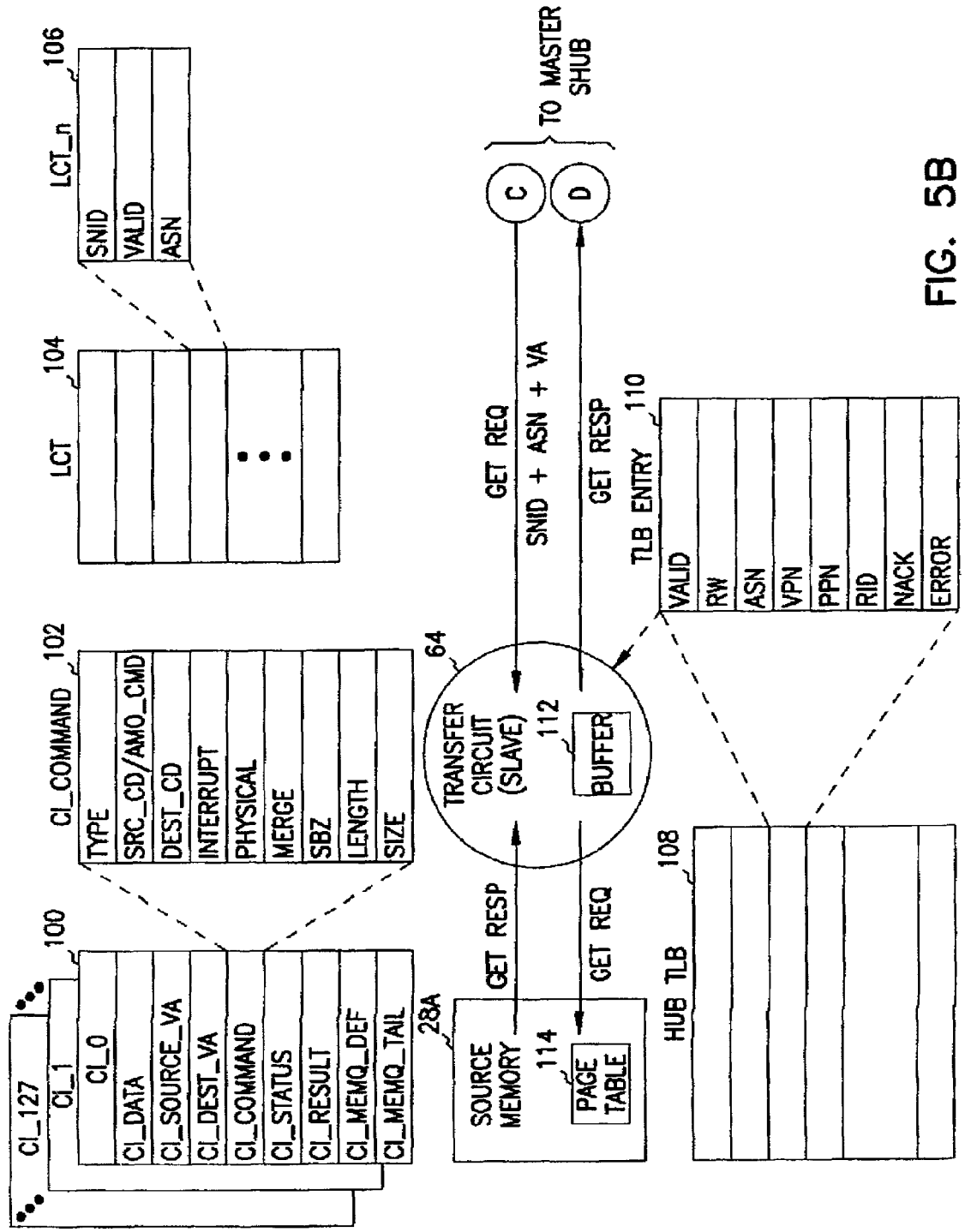

CE 64 and its operation are described in reference to FIGS. 4A and 4B, which illustrate an exemplary transfer of data from local memory resident on a local node to target memory resident on a remote node, and in reference to FIGS. 5A and 5B, which illustrate an exemplary transfer of data from source memory resident on a remote node to local memory resident on a local node. FIGS. 4A and 5A show these two types of transfers from the perspective of the local node, which acts as a master, while FIGS. 4B and 5B show these two types of transfers from the perspective of the remote node, which acts as a slave. It is thus noted that CE 64 is capable of acting either as a transfer master, or as a transfer slave. It will be understood that other types of data transfers (e.g., block transfers from local memory to local memory, or global memory to global memory, or AMOs) are also possible, which use the same mechanisms as those set forth and described explicitly herein.

Referring to FIG. 4A, each CE 64 contains a number of physical communication interfaces (CIs) 100, which are provided to user processes via a virtual memory system. In one embodiment, CE 64 contains a set of 128 physical CIs that support up to 64K virtual CIs. In other embodiments, CE 64 may contain other numbers of physical CIs (e.g., 1, 64, 256, etc.), and the physical CIs may support other numbers of virtual CIs. The OS ensures that the number of virtual CIs mapped at any time does not exceed the number of physical CIs (e.g., with 128 physical CIs, the OS ensures that no more than 128 virtual CIs are mapped at any time). The mapping can be performed at process context switch time, or on demand when a process accesses a currently unmapped virtual CI. When a CI mapping fault occurs, the OS device driver uses a CI mapping from another process via implementation of a suitable replacement policy for physical CIs. CE 64 multiplexes block transfers and AMOs among the requests provided by each of the CIs. The registers and transfer state associated with each CI are part of the associated process' state, and can be left in place across context switches if there are a sufficient number of CIs to meet the demand. In fact, an asynchronous block transfer can continue even while its associated process is not running. If there is excess demand, the OS saves and later restores the state that is associated with a physical CI to allow that CI to be used by another process.

Each CI 100 includes a set of user-accessible MMRs that control block transfers and AMOs, and also provide status and result information. The OS is capable of mapping the MMRs of any one or more CIs 100 into a user process' virtual address space, thereby making the MMRs visible to the user process as virtual addresses in the user space, and giving the user process access to the one or more block transfer and AMO mechanisms. Thus, in system 10, the OS gives the user access to CIs 100, and the user can then program the MMRs without further OS intervention. In contrast, although previous block transfer engines typically included MMRs, there was only one set of MMRs, and the OS was required to retain control over these MMRs to allocate this single resource among multiple users, and to provide memory protection functionality (i.e., if a user process was allowed to write to the MMRs directly, it would have been allowed to write data into a memory area which it did not have access to, thereby circumnavigating the memory protection scheme).

In one embodiment, each CI 100 also includes a set of privileged MMRs that allow the OS or communication engine device driver to manage the CI, but which are not accessible to user processes. These privileged MMRs are described in further detail below.

Referring again to FIG. 4A, in one embodiment, each CI 00 includes a variety of user-accessible MMRs including one or more CI_DATA registers, a CI_SOURCE_VA register, a CI_DEST_VA register, a CI_COMMAND register, a CI_STATUS register, a CI_RESULT register, a CI_MEMQ_DEF register, and a CI_MEMQ_TAIL register. A user process can program these user-accessible MMRs to initiate a block transfer or AMO in two ways: by writing a request directly into the MMRs; or by writing a request to a memory-resident transfer descriptor queue. The user process can also access these MMRs to read the current status of the CI, and to read the result of a previous AMO request. As will become apparent, only a subset of these MMRs may be needed in other embodiments. For example, an embodiment that does not support a memory-resident transfer descriptor queue would not need the CI_MEMQ_DEF and CI_MEMQ_TAIL registers. For another example, an embodiment that does not support AMOs, or does not support AMOs that return a result, would not need the CI_RESULT register. Other embodiments would also be readily apparent to a person of skill in the art upon reading the present disclosure.

Direct Programming of the Communication Interfaces

A user process running on either local processor 24A or 26A is capable of directly programming each CI 100 of CE 64, by submitting requests directly to the CI. The MMRs that are involved in directly programming each CI include the CI_DATA register(s), the CI_SOURCE_VA register the CI_DEST_VA register, and the CI_COMMAND register. The CI_STATUS register is also involved for providing transfer status information, and the CI_RESULT register will be involved if the request is for an AMO that returns a result.

The one or more CI_DATA registers are used to hold immediate data for AMOs and for immediate data sends in an immediate mode of operation (i.e., where a user process supplies the data to be sent to target memory). In one embodiment, the CI_DATA registers hold up to 11 64-bit words of immediate data that may be sent. In other embodiments, the CI_DATA registers may hold less or more immediate data. The CI_SOURCE_VA and CI_DEST_VA registers hold virtual addresses for an (optional) source memory buffer and a destination memory buffer, respectively. The source memory buffer is optional since it is not needed in the immediate mode of operation (since the data being sent is stored in the CI_DATA registers). These virtual addresses are combined with connection descriptors from the CI_COMMAND register to fully specify the memory addresses, with each of the connection descriptors being defined as a handle for the system node identification (SNID) and the address space number (ASN) used to translate the corresponding virtual address.

The fields of the CI_COMMAND register are shown at reference numeral 102 of FIG. 4A. In this embodiment, the CI_COMMAND register contains a TYPE field, a SRC_CD/AMO_CMD field, a DEST_CD field, an INTERRUPT field, a PHYSICAL field, a MERGE field, a LENGTH field, and a SIZE field. The TYPE field specifies the type of request, as follows: 0=memory copy; 1=scalar fill; 2=immediate data send; and 3=AMO. For a memory copy (i.e., TYPE=0), the block of data stored in the source memory buffer indicated by the source virtual address is copied to the destination memory buffer indicated by the destination virtual address. The length of the block transfer (in data elements) is specified by the LENGTH field, and the size of each data element for the block transfer is specified by the SIZE field (with 0=byte, 1=reserved, 2=32-bit, 3=64-bit). In one embodiment of multiprocessor system 10, addresses must be naturally aligned for the specified data element size, and transfer lengths of up to 8 GB-8B are supported.

For a scalar fill (i.e., TYPE=1), the memory block specified by the CI_DEST_VA register is filled with a scalar value from the CI_DATA[0] register. For byte and sword (i.e., single 32-bit word) scalar fills, the scalar is taken from the lower bits of the 64-bit CI_DATA[0] register, and the destination address must be naturally aligned. Scalar fills are used, for example, to zero out an area of memory or fill an array with a constant value.

For an immediate data send (i.e., TYPE=2), the source data is taken from the CI_DATA registers, starting at CI_DATA[0], rather than from memory. For byte and sword transfers, the CI_DATA registers are interpreted as little endian (i.e., byte 0 is stored in bits 7. . . 0 of CI_DATA[0], etc.). The length of the data transfer is limited to the size of the CI_DATA registers (e.g., <=88 bytes (i.e., <=11 dwords)), and the destination address for the immediate data send must be naturally aligned for the specified data element size.

For an AMO (i.e., TYPE=3), the command is taken from the AMO_CMD field of the CI_COMMAND register (the SRC_CD and AMO_CMD fields may share the same space in the CI_COMMAND register since their use is mutually exclusive). The AMO_CMD field is used to write a code that specifies, for example, one or more of the following AMO operations: 0=AtomicAdd; 1=MaskedStore; 4=FetchAdd; 5=MaskedSwap; and 6=CompSwap. Each AMO operation uses one or two immediate operands, which are taken from the CI_DATA[0] and CL_-DATA[1] registers, and some of the AMO operations return the previous value from memory in the CI_RESULT register. The address for the AMO is specified by the CI_DEST_VA register, which may be 64-bit aligned. For example, the AtomicAdd operation atomically adds the integer addend (in CI_DATA[0]) to the value in memory, and does not return a result. The MaskedStore operation atomically writes those bits of the StoreValue (in CI_DATA[0]) corresponding to zero bits in the Mask (in CI_DATA[1]) into memory, leaves the other bits of the memory value unchanged, and does not return a result. The FetchAdd operation atomically adds the integer Addend (in CI_DATA[0]) to the value in memory, and returns the old value of the memory (in CI_RESULT). The MaskedSwap operation atomically writes those bits of the Swaperand (in CI_DATA[0]) corresponding to zero bits in the Mask (in CI_DATA[1]) into memory, leaves other bits of the memory value unchanged, and returns the old value (in CI_RESULT). The CompSwap operation compares the Comperand (in CI_DATA[0]) to the value in memory and, if equal, stores the Swaperand in memory, while returning the old value of the memory (in CI_RESULT). These AMO operations are exemplary, and any combination of these and other AMOs may be supported. AMOs are performed on arbitrary, aligned 64-bit words in memory, and are kept coherent with other references.

The INTERRUPT field of the CI_COMMAND, if set to 1, causes a processor interrupt to be generated upon completion of a request. In response to the interrupt, which may be used with any type of CI request, the processor can call a user-provided interrupt handler. If the INTERRUPT field is cleared (i.e., 0), then no interrupt will be generated.

If the PHYSICAL field is set to 1 and the CI is set to kernel mode, then the block transfer or AMO takes place using untranslated physical addresses. In this case, the connection descriptors from the SRC_CD and DEST_CD fields of the CI_COMMAND register are ignored, and the CI_SOURCE_VA and CI_DEST_VA registers are interpreted by CE 64 as physical system addresses within the local coherence domain.

If the MERGE field is set to 1, then the present CI request will be merged with the next request. If cleared to 0, then the present CI request is interpreted as a stand-alone request or the last of a series of merged requests, in which case the present request must completely finish before CE 64 will be capable of processing the next request for this CI.

The SRC_CD field is used by a user process to specify a connection descriptor (CD) for the (optional) source virtual address for a memory copy request. The DEST_CD field is used by a user process to specify a connection descriptor (CD) for the destination virtual address. The operation of the SRC_CD and DEST_CD fields is discussed below.

To write a request directly into the CI registers, user software (e.g., library code) writes either the CI_DATA register(s) or CI_SOURCE_VA register (depending on the type of request) and the CI_DEST_VA register, and then writes the CI_COMMAND register. Writing the CI_COMMAND register causes the block transfer or AMO operation to be initiated. Upon completion of a CI request, state is saved in the CI_STATUS register, and the CI_RESULT register for certain AMO operations (as described above). No completion status is returned for requests with the MERGE bit set. The CI_STATUS register, and its use, are described below in relation to the CI request flow control and completion status.

Programming the CI Via a Transfer Descriptor Queue

As an alternative to directly programming a CI by writing a transfer request directly to its user-accessible MMs to initiate a block transfer or AMO, in one embodiment, user software (e.g., library code) writes a transfer descriptor to a memory-resident transfer descriptor queue, and then notifies CE 64 via a write to the CI_MEMQ_TAIL register (which stores a tail index into the transfer descriptor queue). When CE 64 is ready to process that queue entry, CE 64 loads the transfer descriptor from memory and processes the transfer descriptor as if the transfer descriptor had been written directly to the MMRs. Thus, by using the transfer descriptor queue mechanism, CE 64 can serially process multiple transfer descriptors.

In order to use a memory-resident transfer descriptor queue, the CI_MEMQ_DEF register is first written to define the base virtual address and size of the queue. This register includes a BASE field and a SIZE field. The BASE field specifies the virtual address of the base of the transfer descriptor queue. This virtual address is translated using the same address translation mechanism used for the transfers themselves (as described below), with CE 64 using connection descriptor zero for these accesses, which points to the local SHUB and is assigned to the local virtual address space of the process that owns the CI. The SIZE field specifies the queue size, in entries. In one embodiment, queues are 128 bytes long, start on a 128-byte boundary, and are a power of two 128-byte entries in size, with the SIZE field encoding the log 2 of the queue size. For example, a 64-entry queue, which would consume 8 KB in memory (i.e., 64 entries*128 bytes/queue=8 KB), would have a SIZE field value of 6. It may be desirable to specify a minimum queue size (e.g., four entries) and/or a maximum queue size (e.g., 32K entries), in which case specifying a queue size outside of these specified values would cause any memory-resident transfers to fail.

For each CI 100, CE 64 maintains a head and a tail pointer for the memory-resident transfer descriptor queue. These head and tail pointers, which are in the form of integers from 0 to $2^{SIZE}-1$, are initialized to 0 (but should not be initialized if the queue contains unprocessed transfer descriptors to prevent such transfer descriptors from being lost).

To add a new transfer descriptor to the queue, user software increments the tail pointer by 1, modulo the queue SIZE, writes the transfer descriptor into the memory-resident transfer descriptor queue at the new tail index location, performs a memory barrier, and then writes the updated tail pointer into the CI_MEMQ_TAIL register. Updating the CI_MEMQ_TAIL register notifies CE 64 that a new transfer descriptor has been queued.

The structure of each memory-resident transfer descriptor is similar in structure to the user-accessible MMRs of each CI 100. In particular, each transfer descriptor includes one or more DATA fields for storing immediate data, a SOURCE_VA field for storing a source virtual address, a DEST_VA field for storing a destination virtual address, a COMMAND field for storing a command, a STATUS field for returning status information, and a RESULT field for returning an AMO result (if any). These fields use the same format as the corresponding user-accessible MMRs of each CI 100, which were described above, and are used for the same purposes as these user-accessible MMRs.

Each CI 100 processes only one request at a time, and waits until a request is complete (i.e., all acknowledgements have been received from the destination end) before moving on to the next request. This introduces a delay between requests that will prevent a single CI 100 from sustaining full network bandwidth for a series of short transfers. To reduce the delay between processing components of a gather/scatter list for a single logical transfer, the MERGE bit of the COMMAND value can be set to inform CE 64 that the next transfer descriptor in the queue can be processed as soon as CE 64 is able to do so, even before receiving all acknowledgements for the present transfer. The only completion status returned for requests with the MERGE bit set is that CE 64 has finished processing them (thus freeing up the memory queue location). This does not, however, indicate the transfer or AMO completed successfully. Thus, all transfer requests that are merged together will complete or fail as a group. In the case of failure, no guarantee is made as to which individual transfers completed. Regardless of failure, no guarantee is made as to the order in which individual transfer requests complete. The last transfer descriptor of a gather/scatter list should use a zero MERGE bit. The MERGE bit should not be set in an AMO request that returns a result (to avoid generating a BAD_COMMAND error).

CI Request Flow Control and Completion Status

The current state of each CI 100 can be read from its CI_STATUS register. This register contains various fields, including a READY field, a HEAD field, a STATUS field, a CMD_OVERFLOW field, a QUEUE_OVERFLOW field, and a SHUTDOWN field. The READY field holds a bit which indicates whether the CI is ready for another directly-programmed request. If set, the READY bit indicates that the CI is available to begin processing a new request (i.e., processing of the last request is complete, and there are no requests in the memory-resident transfer descriptor queue). If the READY bit is set, a write to the CI_COMMAND register will clear the READY bit and trigger processing of the new request. If the READY bit is clear, any write to the CI_COMMAND register will set the CMD_OVERFLOW bit, and the command will be ignored. The CI_DATA, CI_SOURCE_VA and CI_DEST_VA registers may be written while the READY bit is 0.

The read-only HEAD field is the current head pointer for the memory-resident transfer descriptor queue. The current head pointer is initialized to 0 on a write to the CI_MEMQ_DEF register, and is incremented by one, modulo the queue size, as CE 64 begins processing successive queued transfer descriptors. Thus, the current head pointer points to the last transfer descriptor currently being processed, or to the last processed transfer descriptor if a queued transfer descriptor is not currently being processed.

If a CI 100 is in the ready state (READY=1) when a transfer descriptor is added to an empty memory-resident transfer descriptor queue, the READY bit is cleared and CE 64 begins processing the queued transfer descriptor. Similarly, if the memory queue is not empty when CE 64 completes processing of a directly-programmed request, the READY bit will remain cleared, and CE 64 will begin processing the queued transfer descriptor. CE 64 will continue to process memory-resident transfer descriptors, updating the current head pointer as it does so, until the head and tail pointers are equal (indicating that the queue is empty). User software is responsible for leaving at least one empty queue location (i.e., by not setting the CI_MEMQ_TAIL register equal to the current HEAD value).

The READY bit is cleared to 0 by CE 64 when a new request is started, regardless of whether the request was caused by directly programming the CI MMRs or by submitting a request to the memory-resident transfer descriptor queue. The READY bit is set to 1 when CE 64 finishes processing a request and the transfer descriptor queue is empty.

If the MERGE bit is set in a request command, the CI will be ready to process the next request (which will be treated as a continuation of the current request) as soon as the request packets for the current request have been sent. In this case, if some of the request packets require retransmission due to receiving a negative acknowledgement (i.e., "nack"), these request packets may be interleaved with the new request packets from a new request.

The completion status for a directly-programmed request is reported by a code in the STATUS field of the CI_STATUS register. The request completion codes include: 0=NO_STATUS (no status; request may be currently processing); 1=SUCCESS (successful completion); 2=PROCESSED (for a request with the MERGE bit set, this bit indicates only that CE 64 has finished processing the request, but not that the request has completed successfully); 3=BAD_COMMAND (a malformed CI_COMMAND value was written); 4=BAD_CD (a bad connection descriptor was specified); 5=TIME_OUT_SRC (transfer timed out on source connection); 6=TIME_OUT_DEST (transfer timed out on destination connection); 7=WRITE_ERROR (write to read-only page at destination); 8=TRANS_ERR_SRC (translation error for source connection, set by an error response due to a special remote TLB entry, or by local OS); 9=TRANS_ERR_DEST (translation error for destination connection); and 10=HW_ERROR (hardware error). If the request was for an AMO that returned data, the return value is saved in the CI_RESULT register upon completion. Note that merged requests are not allowed to return AMO results.

Upon completing a request from the transfer descriptor queue, CE 64 writes a result code to the STATUS field of the transfer descriptor in the queue. If the request was an AMO that returned a result, the result is written to the RESULT field of that transfer descriptor. If the MERGE bit of the request's command was set, a request completion code indicating "PROCESSED" (i.e., a value of 2) is saved after the request was processed to indicate only that CE 64 is done with the transfer descriptor and the queue location may be reused (not that the request completed successfully). User software can poll the STATUS locations in the transfer descriptors to determine when individual requests have completed.

The VIA specification for an interface for cluster-based computing requires that queued transfers for a given connection not be performed after a transfer fails. To provide support for this requirement, the SHUTDOWN bit will be set in the CI_STATUS register if a failure associated with a given connection occurs, and CE 64 will stop processing requests for that particular CI 100 until the SHUTDOWN bit is cleared by the software.

System Privileged Registers Associated with a CI

As noted above, each CI 100 may include a set of privileged MMRs that allow the OS or communication engine device driver to manage the CI, but which are not accessible to user processes. The privileged MMRs may include, for example, a combination of the following: a CI_CONTROL register for control information for this CI; a LCT[0] register for holding entry 0 of a local connection table (LCT), which is used for all transfer descriptor accesses and most memory transfers, and has an implied node number of the local SHUB—thus specifying only an address space number (ASN); a TIMEOUT_CTRL register for setting the number of cycles for waiting for a response or the number of nacked retries before timing out the present transfer or AMO; a RETRY_CTRL register to support throttle and backoff for a retry mode; a CONG_CONTROL register for specifying the maximum number of outstanding packets for block transfers for this CI; an LCT_BASE register for specifying the physical memory location of the associated LCT; a CI_STATE register for providing various state information associated with the current block transfer or AMO (e.g., such as queue pointers, buffer management information, quiescent flag, retry counters, forward progress algorithm information, etc.). The CI_CONTROL register may include the following fields: a RESET field (writing a 1 to this bit resets all fields and enables the CI); a SHUTDOWN field (writing a 1 to this bit gracefully shuts down the virtual interface by causing the interface to stop issuing GETs and AMOs, and by sending all PUTs and waiting for all completions); a KILL field (writing a 1 to this bit kills the current transfer and shuts down the CI by waiting for all currently outstanding packets to complete and by freeing up any buffer space associated with this transfer); an LCT_SIZE field (for specifying the number of entries in the LCT); a CIN or "communication interface number" field (a number used to qualify hits in a local connection cache or LCC); a KERNEL field (if set to 1, this virtual interface is kernel privileged and can do physical address transfers); an INT field (for specifying which local processor to interrupt upon an interrupt-generating completion); a USED field (set to 1 if any stores occurred to this CI; can be cleared by the OS when a physical CI is written); etc. The TIMEOUT_CTRL register may contain the following fields: a TIME_LIMIT field for specifying the number of cycles to wait for any response packet before timing out a transfer or AMO (0 indicating no delay-based timeout); and a RETRY_LIMIT field for specifying the number of nacked retries before timing out a transfer or AMO (0 indicating no retry-based timeout). The RETRY_CTRL register may contain the following fields: a RETRY_DELAY field for specifying the number of clocks to delay before resending nacked transfer packets; and a BACKOFF register for specifying the number of nacked retries before doubling the current retry delay (0 indicating never increase the delay). Note that CE 64 may contain separate timeout and retry delay registers for each CI, or may contain one or more global timeout and retry delay registers which may be selected by each CI using an index field. It is to be understood that a combination of these or other privileged MMRs may be provided by CE 64 to allow for proper management of the CIs by the OS or CE device driver.

Although CE 64 is described herein as supporting both direct programming and transfer descriptor queue modes of operation, it is to be understood that a communication engine which supports only one of these modes of operation may also be employed.

Address Translation Mechanism

In order to perform a block transfer or AMO, CE 64 includes an address translation mechanism for translating the (optional) source virtual address and the destination virtual address. The address translation mechanism is also used for translating transfer descriptor queue virtual addresses (if this queue is being used). The address translation mechanism is oriented around the concept of "connections", which use a local connection table (LCT) on the local end and a SHUB translation-lookaside buffer (TLB) on the connection endpoint to perform the address translation. The connection endpoint is specified by the user process (e.g., using the SRC_CD or DEST_CD fields of the CI_COMMAND register). If the connection endpoint is the local node, then the address translation uses a TLB on the local SHUB. However, if the connection endpoint is a remote node, the address translation uses a TLB on the remote SHUB. The address translation for all virtual addresses (i.e., source and destination virtual memory addresses for block transfers; AMO virtual addresses; transfer descriptor queue virtual addresses) takes place using the following steps:

1. A user process running at a local node provides a "connection descriptor" (CD) and a virtual address (with the "connection descriptor" being defined as a handle that specifies the endpoint node of a virtual connection);
2. The CD indexes into a protected "local connection table" (LCT) to produce an endpoint SHUB number (i.e., the local SHUB number if the connection endpoint is the local node, or a remote SHUB number if the connection endpoint is a remote node) and an associated address space number (ASN);
3. The virtual address and ASN are communicated to the endpoint SHUB identified by the endpoint SHUB number (i.e., the local SHUB if endpoint is the local node, or the remote SHUB if the endpoint is the remote node);
4. The virtual address is translated to a physical address on the endpoint SHUB, as qualified using the ASN (note that the physical address may be mapped to anywhere in the coherence domain of the endpoint SHUB).

By performing virtual-to-physical address translations at the remote end (i.e., when the CD specifies that the endpoint of the virtual connection is the remote node), the amount of context that the local SHUB TLB needs to hold will be significantly reduced, which will result in a corresponding improvement in SHUB TLB hit rates. The memory management between the coherence domains of a clustered system is also advantageously decoupled.

The address translation mechanism used by CE 64 uses an external TLB located on the local SHUB, or an external TLB located on a remote SHUB, but does not use the TLBs which are used by the processors themselves to perform translations. Thus, the TLBs used by CE 64 may be referred to as "external" TLBs since they are external to the processors.

Local Address Translation

Referring again to FIG. 4A, each CI 100 is associated with a LCT 104, which contains a plurality of LCT entries, with each LCT entry having a plurality of fields 106. The LCT 104 for a given CI 100 is indexed or otherwise accessed by a CD, and provides a system node identifier (SNID) of the endpoint SHUB, a VALID bit and an endpoint ASN. The CD, the LCT and its fields, and the operation of the CD and LCT, are now described.

A CD is a handle that specifies the endpoint of a virtual connection. The CD is obtained from the OS by a local user process (e.g., which makes an OS call to set up the CD), and points the process to an address space, thereby providing a handle through which the process can access that space. The CD provides translation and protection for accessing the connection (analogous to the manner in which a file descriptor is used to access an open device). Once initially obtained from the OS, a user process can use the CD as part of a communication request to CE 64. For example, a user process may specify the CD for a source virtual address used by a memory copy operation in the SRC_CD field of the CI_COMMAND register, and may specify the CD for a destination virtual address of a memory copy, scalar fill, immediate data send or AMO operation in the DEST_CD field of the CI_COMMAND register. As a special case, CD zero points to entry zero of the LCT, for use in translating accesses to the CI's memory-resident transfer descriptor queue and for translating local memory accesses. Note that a CD can be used to define a logical connection between two different virtual address spaces. Once this connection has been established, a user on one side of the connection has access to the entire virtual address space of the user on the other side of the connection. However, the only embodiment of the connection resides in the local LCT (i.e., there's no embodiment in the target end).

The OS maintains a LCT for each user process, which is indexed by the CD. In one embodiment, the LCT is a memory-based table with a plurality of 32-bit entries, and the CD is an offset into the LCT. The LCT, which is set up by the OS and is not writeable by the user, provides extra information which is added to the virtual address provided by the user to allow the endpoint or target SHUB to perform address translations. The extra information provided by each LCT entry 106 includes the system node or SHUB identifier (SNID) of the connection endpoint (which may be the local node, or a remote node) for use in routing packets to the correct endpoint node, a VALID bit for indicating whether the LCT entry is valid or invalid (e.g., for use in tearing down a connection in an otherwise dense table), and an ASN which serves as a key for qualifying or validating the address translation at the specified endpoint node by informing the endpoint SHUB of the virtual address space that the virtual address being supplied relates to. Since the LCT is set up by the OS in advance and is not writeable by the user, memory protection is delegated to the hardware, and the OS need not intervene to ensure memory protection on every transfer.

As described above, each entry of the LCT contains the node number of the connection endpoint (i.e., the SNID), which may be local or on a different machine, and a key which is used for validation at the specified node. The key is sent by hardware to the specified node with the memory request, and is used as part of the remote translation step at the specified node. The key can be used to qualify a translation in a general purpose TLB. Alternatively, the key may be used to access a specific memory translation table, if memory associated with the particular connection has been registered and pinned down.

The first entry of the LCT (i.e., LCT[0]), pointed to by CD zero, is a special case. In particular, the SNID of LCT[0] always points to the local SHUB, and the ASN of LCT[0] is set to the ASN of the local process' virtual address space. This special case allows CD zero to be used to translate accesses to the CI's memory-resident transfer descriptor queue. CD zero is also often used as the source and/or destination CD for memory transfers since at least one of the source and the destination memory is often local. For example, a local block copy operation (i.e., a block copy operation from one local memory location to another) may use CD zero to specify both the source and destination.

In one embodiment, a local connection cache (LCC) is provided on the SHUB to maintain a cache of LCT entries. The LCC is hardware-reloaded from the current virtual interface's LCT as necessary. If an access of the LCC does not result in a hit, a BAD_CD error occurs. The entries in the LCC may include a communication interface number (CIN), which must match the CIN associated with the accessing CI to result in a cache hit.

To support local address translations, each SHUB contains a translation-lookaside buffer (TLB) 108 for performing local address translations for both block transfers and AMOs. A TLB is a cache that holds only page table mappings. TLB 108 may be referred to as an external TLB since it is external to the local processors. The TLB on the local SHUB is used when the associated CD indexes an LCT entry that points to the local SHUB (i.e., via the SNID field). Since the first entry of the LCT always points to the local SHUB, the user software may thus specify CD zero for local memory accesses. TLB 108 includes a plurality of TLB entries, and each entry 110 includes a VALID field, an RW field, an ASN field, a VPN field, a PPN field, an RID field, a NACK field, and an ERROR field.

The VALID field of each TLB entry indicates whether that entry is valid (0=no; 1=yes). The RW field indicates whether the destination memory location is write-protected (0=read only; 1=read/write), and a PUT request that matches a TLB entry with the RW field set to 0 generates a write protection error response. The ASN in each TLB entry is used to qualify an address match (i.e., the ASN in the TLB entry must match the ASN presented to the TLB for the TLB entry to hit). Including the ASN in the TLB entry allows entries for multiple processes/address spaces to reside in the TLB concurrently.

The VPN field holds the virtual page number for the TLB entry. For a TLB entry hit to occur, the bits above the page boundary (determined by the page size) of the supplied virtual address must match the corresponding bits of the VPN. The PPN field holds the physical page number which is mapped to the virtual address. Upon a hit, the bits above the page boundary of the virtual address are replaced by the corresponding bits of the PPN. Note that a TLB cache hit requires: (1) the supplied virtual address bits above the page boundary to match the corresponding bits of the VPN; (2) the supplied ASN to match the ASN stored in the ASN field; and (3) the VALID bit in the TLB entry to be set to 1.

The RID field stores the region identifier used for TLB shootdown, and is set to a number matching the RID used in processor TLB shootdown. The shootdown mechanism waits for any outstanding packets currently using an address translated by a given TLB entry to complete before acknowledging completion of the SHUB TLB shootdown event.

If the NACK ("negative acknowledgment") bit is set, CE 64 will respond to any matching request packet with a retry nack. In the event that a page fault is detected, the remote OS has the option to pre-load a matching TLB entry with the NACK bit set to cause any subsequent, matching requests to be nacked without interrupting the remote processor again. Once the page arrives from disk, the NACK bit can be cleared. If the ERROR bit is set, CE 64 will respond to any matching request packet with a translation error response.

The steps involved in performing a local address translation are as follows. First, a user process running on the local node provides a virtual address and an appropriate CD. For example, a user process performing a local block copy by directly programming a CI would write the virtual address of the source memory buffer into the CI_SOURCE_VA register, write the virtual address of the destination memory buffer into the CI_DEST_VA register, and then write a command to the CI_COMMAND register to initiate the transfer. In this case, the TYPE field of the CI_COMMAND register would be set to 0 to command a memory copy operation, and the SRC_CD and DEST_CD fields of the CI_COMMAND register would be written with zero to indicate that the local node is the endpoint of the virtual connection for both the source and destination. Then, after the transfer is initiated, hardware accesses the LCT using the CD as an index, and produces the SNID for the local SHUB and an associated ASN. In the example, the hardware would access the first entry of the LCT twice (since CD zero was used for both the source and destination), and would retrieve the SNID for the local SHUB for both the source and destination. Then, the virtual address supplied by the user and the ASN from the LCT entry would be applied to the TLB of the local SHUB to look for a matching TLB entry. Again, in this example, this would occur for both the source and destination. If a matching TLB entry is found (i.e., both the virtual address and ASN match), the VPN of the virtual address is replaced by the PPN from the matching TLB entry, and the physical address is used to perform the memory access. Thus, the address translation mechanism can perform local address translations.

As this discussion illustrates, a LCT entry can point to the local SHUB for local memory accesses. In this case, any access using the associated CD need not be forwarded to a remote SHUB for translation. Rather, the TLB-based translation from a virtual address to a physical address occurs at the local SHUB using the TLB located on the local SHUB.

Remote Address Translation

The SHUB at each node of multiprocessor system 10 contains an external TLB to perform address translations for both block transfers and AMOs. As described above, the local TLB can be used by a local CE 64 to perform translations for local memory accesses, thereby allowing the user to program the CE using virtual addresses. As now described, CE 64 can also be programmed to send virtual addresses to a remote or target node for remote memory accesses (using the CD associated with the virtual address to identify the remote node), with the TLB on that node being used to translate those addresses. By performing the translation at the target node, each of the (external) TLBs needs information only about its own local or nearby memory, thereby significantly reducing TLB pressure.

Remote address translation is first described in reference to an exemplary transfer of data from local memory on a local node to remote memory on a remote node. This transfer involves a first CE 64 on the local node, referred to as the master CE, and a second CE 64 on the remote node, referred to as the slave CE. FIG. 4A shows the transfer from the perspective of the local node, and FIG. 4B from the perspective of the remote node.

Referring to FIG. 4A, to perform this exemplary transfer, a user process running on the local node first programs a CI of the master CE. This programming includes writing the virtual address of the source memory buffer into the CI_SOURCE_VA register, writing the virtual address of the destination memory buffer into the CI_DEST_VA register, and then writing a command into the CI_COMMAND register to initiate the transfer. (In this example, it is assumed that the CI is directly programmed by the user. Alternatively, the user process could use the memory-resident transfer descriptor queue, described above.) In this case, the TYPE field of the CI_COMMAND register is set to 0 to command a memory copy operation, the SRC_CD field of the CI_COMMAND register is written with zero to indicate that the local node is the endpoint of the connection for the source, and the DEST_CD field of the CI_COMMAND register is written with a value pointing to an LCT entry specifying that the remote node is the endpoint of the connection for the destination.

Then, after the transfer is initiated, the master CE performs a series of GET requests to obtain the source data from the local memory, and a series of PUT requests to send the data to the remote node. In one embodiment, the master CE includes a buffer 112 for temporary data storage during block transfers, which allows the master CE to pipeline data transfers. To perform the GET requests, hardware accesses the LCT using the SRC_CD as an index, and produces the SNID for the local SHUB and an associated ASN. Then, the source virtual address (from the CI_SOURCE_VA register) and the ASN from the LCT entry are applied to the TLB of the local SHUB. If a matching TLB entry is found (i.e., both the source virtual address and ASN match) for a successful translation, the VPN of the source virtual address is replaced by the PPN from the matching TLB entry, and the resulting physical address is used by the GET request to perform the local memory access. (While the PPN in this example points to a local memory location, the PPN could point to any memory location within the same coherence domain, such as a remote location.) The data from local memory is then returned to the master CE via a GET response. The data returned by the GET response may be placed in buffer 112 to await transfer. Thus, the address translation mechanism is used to perform the address translations for the source.

To perform the PUT requests, hardware accesses the LCT using the DEST_CD as an index to produce the SNID for the remote SHUB and an associated ASN. Then, the master CE formats a series of PUT requests into packets. Each PUT request packet contains the SNID (which tells the system to route the request to the remote node), the ASN (which tells the remote SHUB which address space the write will be made to), the destination virtual address, and the PUT data (i.e., the data being written, which came from the local memory via buffer 112). Note that, in the case of an immediate mode transfer, the user process would have written the immediate data into the CI_DATA register(s), and the GET requests to local memory would not have been needed. The series of PUT requests are then communicated (i.e., routed) via the network to the remote node for translation.

Referring now to FIG. 4B, each PUT request packet is received by the slave CE 64 at the remote node. The slave CE applies the virtual address and associated ASN from the PUT request to the remote TLB (i.e., the TLB on the remote SHUB). If a matching TLB entry is found (i.e., both the virtual address and ASN match) for a successful translation, the VPN of the virtual address is replaced by the PPN from the matching TLB entry to form the physical address, and the request packet is forwarded to the appropriate physical memory location in the SHUB's coherence domain. The SHUB at the remote end of the connection may also allocate buffer space (e.g., in buffer 112) to accept a normal coherence protocol nack for the physical memory access and to potentially retransmit the request packet. When a successful PUT response is received from the target memory, the slave CE 64 forwards the response to the master CE, and frees the corresponding buffer location.

Thus, the address translation mechanism may be used to perform both local and remote address translations, with the TLB on the local SHUB used for translating a virtual address if a CD indicates that the local node is the connection endpoint, and the TLB on a remote SHUB used for translating the virtual address if a CD indicates that the remote node is the endpoint. As this example shows, each CE is capable of acting as a master or a slave.

Remote address translation is next described in reference to an exemplary transfer of data from source memory on a remote node to local memory on a local node. This transfer involves a first CE 64 on the local node, referred to as the master CE, and a second CE 64 on the remote node, referred to as the slave CE. FIG. 5A shows the transfer from the perspective of the local node, and FIG. 5B from the perspective of the remote node.

Referring to FIG. 5A, to perform this exemplary transfer, a user process running on the local node programs a CI of the master CE 64. This programming includes writing the virtual address of the source memory buffer into the CI_SOURCE_VA register, writing the virtual address of the destination memory buffer into the CI_DEST_VA register, and then writing a command into the CI_COMMAND register to initiate the transfer. (In this example, it is assumed that the CI is directly programmed by the user. Alternatively, the user could use the memory-resident transfer descriptor queue, described above.) In this case, the TYPE field of the CI_COMMAND register is set to 0 to command a memory copy operation, the SRC_CD field of the CI_COMMAND register is written with a value pointing to an LCT entry specifying that the remote node is the endpoint of the connection for the source, and the DEST_CD field of the CI_COMMAND register is written with zero to indicate that the local node is the endpoint of the connection for the destination.

Then, after the transfer is initiated, the master CE performs a series of GET requests to obtain the source data from the remote node, and a series of PUT requests to write the data to local memory. In one embodiment, the master CE includes a buffer 112 for temporary data storage during block transfers, which may be used to pipeline the data transfers. To perform the GET requests, hardware accesses the LCT using the SRC_CD as an index to produce the SNID for the remote SHUB and an associated ASN. Then, the master CE formats a series of GET requests into packets, with each packet containing the SNID (which tells the system to route the request to the remote node), the ASN (which indicates the associated address space to the remote SHUB), and the source virtual address. The series of GET requests are then communicated via the network to the remote node.

Referring to FIG. 5B, each GET request packet is received by the slave CE 64 at the remote node. The slave CE applies the virtual address and ASN from each GET request to the remote TLB (i.e., the TLB on the remote SHUB). If a matching TLB entry is found (i.e., both the virtual address and ASN match) for a successful translation, the VPN of the virtual address is replaced by the PPN from the matching TLB entry to form the physical address, and the request packet is forwarded to the appropriate physical memory location in the SHUB's coherence domain. The SHUB also allocates buffer space to accept a normal coherence protocol nack and to potentially retransmit the request packet. When a successful GET response (which will contain the data) is received from the source memory, the slave CE 64 forwards the response to the master CE, and frees the corresponding buffer location. Thus, the address translation mechanism performs remote address translations.

Referring back to FIG. 5A, the master CE 64 receives the GET responses, including the data, from the slave CE. This data may be placed into buffer 112 to pipeline the transfer. Then, to perform PUT requests to write this data into local memory, hardware accesses the LCT using the DEST_CD as an index, and produces the SNID for the local SHUB and an associated ASN. The destination virtual address (from the CI_DEST_VA register) and the ASN from the LCT entry are applied to the TLB of the local SHUB. If a matching TLB entry is found (i.e., both the virtual address and ASN match) for a successful translation, the VPN of the destination virtual address is replaced by the PPN from the matching TLB entry, and the physical address is used to form the PUT requests to write the data to local memory. The master CE then receives PUT responses from the local memory. Thus, the translation mechanism also performs local address translations.

As indicated above, in one embodiment, the master CE 64 includes buffer 112 for temporary data storage during block transfers. Buffer 112 may comprise on-chip random access memory (RAM). CE 64 attempts to maximally pipeline data transfers by continuing to issue GET requests as buffer space permits, and by issuing PUT requests as data arrives from the GETs. In this embodiment, certain CIs 100 (e.g., CI 0 and CI 1) include dedicated buffer storage, and have a higher arbitration priority than the other CIs, in order to allow the OS to ensure a minimal service level in the face of a large number of contending CIs.

As this discussion illustrates, an LCT entry can point to the local SHUB or a remote SHUB. If an LCT entry points to the local SHUB, an address translation for a block transfer or AMO takes place using the external TLB on the local SHUB. If the LCT entry points to a remote SHUB, however, a virtual address is communicated across the network, and address translation takes place using the external TLB on the remote SHUB. Such remote translation relieves pressure in the SHUB TLBs, and supports communication with remote coherence domains in clustered systems. Additional buffering may be allocated at the remote end of the connection to deal with protocol nacks for physical memory accesses.

In another embodiment, the master CE is not located on the local node (i.e., is not located on the same node as the source memory). Instead, the master CE is located on a node remote from the node of the source memory. In this embodiment, it is sufficient that the master CE and the source memory are in the same coherence domain.

In yet another embodiment, the slave CE (i.e., the target CE which performs the memory address translation) is not located on the same node as the target memory. Instead, the slave CE is located on a node remote from the node of the target memory. In this embodiment, it is sufficient that the slave CE and the target memory are in the same coherence domain.

In still another embodiment, which is a combination of the previous two embodiments, the master CE is located on a node remote from the source memory node, and the slave CE is located on a node remote from the target memory node.

Congestion Control

The remote address translation feature of CE 64 can introduce several types of congestion into multiprocessor system 10. The first type of congestion may occur even if all of the remote translation attempts hit in the TLB on the remote SHUB. The second type of congestion, which may be more serious than the first, occurs on remote translation faults. The following paragraphs discuss methods for dealing with both types of congestion.

The first type of congestion, which may occur even in the desired case of all remote address translation attempts hitting in the TLB on the remote SHUB, is due to CE 64 being capable of pipelining a large number of packets when performing block transfers. This is especially true for GET requests, where the response packet may be much larger than the request packet, which may lead to severe network congestion at the remote node. To deal with this problem, each CI 100 includes a limit on the maximum number of outstanding packets for block transfers for that particular CI. This value, specified using the privileged CONG_CONTROL register discussed above, may be tuned at any time. In the event this static limit does not deal efficiently with dynamic congestion caused by changing traffic patterns or conflicts among multiple CEs, an adaptive congestion control mechanism may be used, such as the adaptive congestion control mechanism used in the GIGARING network on the Cray T3E system from Silicon Graphics, the assignee of this application.

The second (and potentially more serious) type of congestion arises due to remote translation faults (i.e., no matching entry in the TLB on the remote SHUB). On a remote translation fault, the slave SHUB responds to the request packet by sending a remote-translation nack (i.e., negative acknowledgment) to the master CE, and by interrupting one of local processors 24A or 26A (as specified by the INT field of the privileged CI_CONTROL register) to handle the miss. The slave SHUB also provides the interrupt handler with the faulting ASN, virtual address and source node (and possibly the CIN).

Typically, the interrupt handler for the remote TLB miss can quickly fix the TLB by, for example, loading the missing TLB entry from a page table 114 in local memory. Page table 114 may be updated by the OS whenever the virtual address space changes, and a hardware refill may be used to load the missing SHUB TLB entry from page table 114. In one embodiment, page table 114 is the same page table used by the processor to update its own TLB. In another embodiment, page table 114 is distinct from the page table used by the processor, and the OS supports both the processor's page table and page table 114. This latter embodiment advantageously allows page table 114 to use a different format than the page table used by the processor, thereby allowing page table 114 to be used with different types of processors with differing page table requirements, and to be immune to any changes which may be made to the processor's page table requirements. While the interrupt handler is running, the SHUB can continue to process incoming block transfer and AMO request packets, provided they hit in the TLB. Any misses that occur before the processor finishes handling the last miss will be responded to with a nack (since the SHUB does not save information about the new misses), but the processor will not be interrupted.

In some cases, however, the interrupt handler for the remote TLB miss will not be able to quickly fix the TLB. This will occur, for example, where a page fault is detected (i.e., the missing TLB entry is not located in page table 114). In these cases, the remote OS has the option of pre-loading a matching TLB entry with the NACK bit. Setting the NACK bit will cause any subsequent, matching requests to be nacked without interrupting the processor again. Once the associated page arrives from disk, the NACK bit can be cleared.

Upon receiving a nack due to a remote translation fault, the master CE goes into a retry mode. In this mode, the master CE repeatedly resends the nacked packet until the packet is finally accepted. Thus, the nack merely informs the master CE that the resource is busy and should be retried since it will eventually be successful (i.e., there is no error). The retry mode uses relatively little network bandwidth since there is only one outstanding packet that is being sent back and forth between the master CE and slave CE. In the non-error case, the TLB on the remote SHUB will eventually be updated with a new, matching entry, and the retried packet will be accepted. At that time, the master CE will turn the retry mode off and, in the case of a block transfer, will restart the pipelined transfer.

In the case where the missing TLB entry can be quickly loaded from page table 114, the master CE may not need to be informed about the delay. However, in the case where the remote interrupt handler determines that a page fault has occurred, it may be desirable to have the remote OS notify the OS at the master CE's coherence domain, so the mastering process can be context switched to avoid waiting for resolution of the page fault.

For a block transfer, the master CE may have many packets in flight at the time of the first nacked packet. Most of these packets are also likely to come backed nacked, although some packets may succeed if they were targeted at a different page. Retries for these other packets are preferably suppressed (i.e., the retry mode is used only for the first nacked address). In one embodiment, after the retried packet is eventually accepted, the master CE is allowed to retransmit some of the previously accepted packets.

Since a new TLB entry could be replaced before the nacked packet can use it, and since an unlucky packet could always arrive to find the remote processor servicing a different TLB miss, a forward progress mechanism may be implemented. This mechanism would eventually inhibit TLB miss interrupts for newer packets, thereby guaranteeing that the older nacked packets are able to be serviced in the TLB. Successful translations would not be affected by this priority mechanism. Since this priority mechanism should be resilient to nacked packets that are not being retried (e.g., the corresponding transfer may have timed out), this priority mechanism should be capable of timing out priority levels.

In the case of a legal translation resulting in either a TLB refill from the page table, or a page fault, the retry mechanism may suffice. However, in the case of an illegal access where no translation is available, a considerable delay may occur before the transfer is shut down (e.g., by a time-out, or by the remote OS notifying the local OS). In this case, it may not be desirable to repeatedly interrupt the remote processor. To handle this case, the master CE may use a programmable delay (e.g., using the RETRY_DELAY field of the privileged RETRY_CTRL register to specify a number of clocks to delay before re-sending a nacked transfer packet) and an exponential back-off policy (e.g., using the BACKOFF field of the RETRY_CTRL register to specify a number of nacked retries before doubling the current retry delay) in the retry mechanism. Alternatively, the remote OS can load a matching TLB entry with the ERROR bit set, which will cause an error response to be sent to any subsequent, matching request packet, so the associated block transfer or AMO will be completed with an error condition. The ERROR bit may then be cleared at the next time any matching page is actually allocated. It may also be desirable to notify the master CE's OS about the illegal translation, such that this OS may choose to kill the offending process, or to simply go into the CI register set to mark the transfer as complete with an error status.

Since SHUB TLB faults do not immediately shut down the entities creating the references, and since the TLB miss interrupt handler steals cycles from a processor other than the processor running the process which caused the fault, it is desirable to keep SHUB TLB faults to a minimum. This can be accomplished by using a relatively large and associative TLB to minimize TLB misses. For example, the TLB may have 1024 or 2048 entries, and may be 8-way associative. The TLB may also support multiple page sizes (e.g., the same set used in the processor's TLBs), with each way being configurable to its own page size and resulting in a maximum of 8 page sizes which can be used at one time.

Note that, while some examples herein use an external TLB on a remote node to perform remote translation to access memory located on the remote node, the resulting physical address may map to another node in the multiprocessor (i.e., the target or source physical memory need not be on the remote node). If not, the physical address resulting from the translation is forwarded over the interconnection network. The remote node may include a forwarding mechanism which allocates temporary buffer space for forwarded requests (or uses extra virtual channels in the network) to prevent deadlock. Nacks may be used if buffering cannot be allocated. A forward progress mechanism ensures that requests nacked due to TLB misses or buffer overflows cannot be indefinitely starved.

Virtual Channels and Deadlock Avoidance

To avoid network deadlock caused by forwarding packets after remote translation, multiprocessor system 10 uses two request and two response virtual channels. Packets are switched between the two request channels or two response channels when forwarding at a SHUB. This technique is also used when forwarding I/O traffic between network planes at a SHUB. Routing tables may be used to determine which virtual channels are used.

In small, routerless multiprocessor systems, all four virtual channels are used to allow torus routing configurations, and forwarding is not allowed. In such systems, either all translations are required to occur at the mastering CE (by restricting LCT entries), or remote translations are only allowed to translate to memory attached to the remote SHUB.

In larger multiprocessor systems, since SHUB-to-SHUB packet transmission requires only one virtual channel, the two request and two response channels are available for forwarding. If the virtual channel assignments in the routing table use the REQ0 and RESP0 channels for normal memory traffic, and use the REQ1 and RESP1 channels for packets that require forwarding, the acyclic dependency graph among virtual channels involved in a forwarding action would be REQ1→REQ0→RESP0→RESP1.

Figure 6:
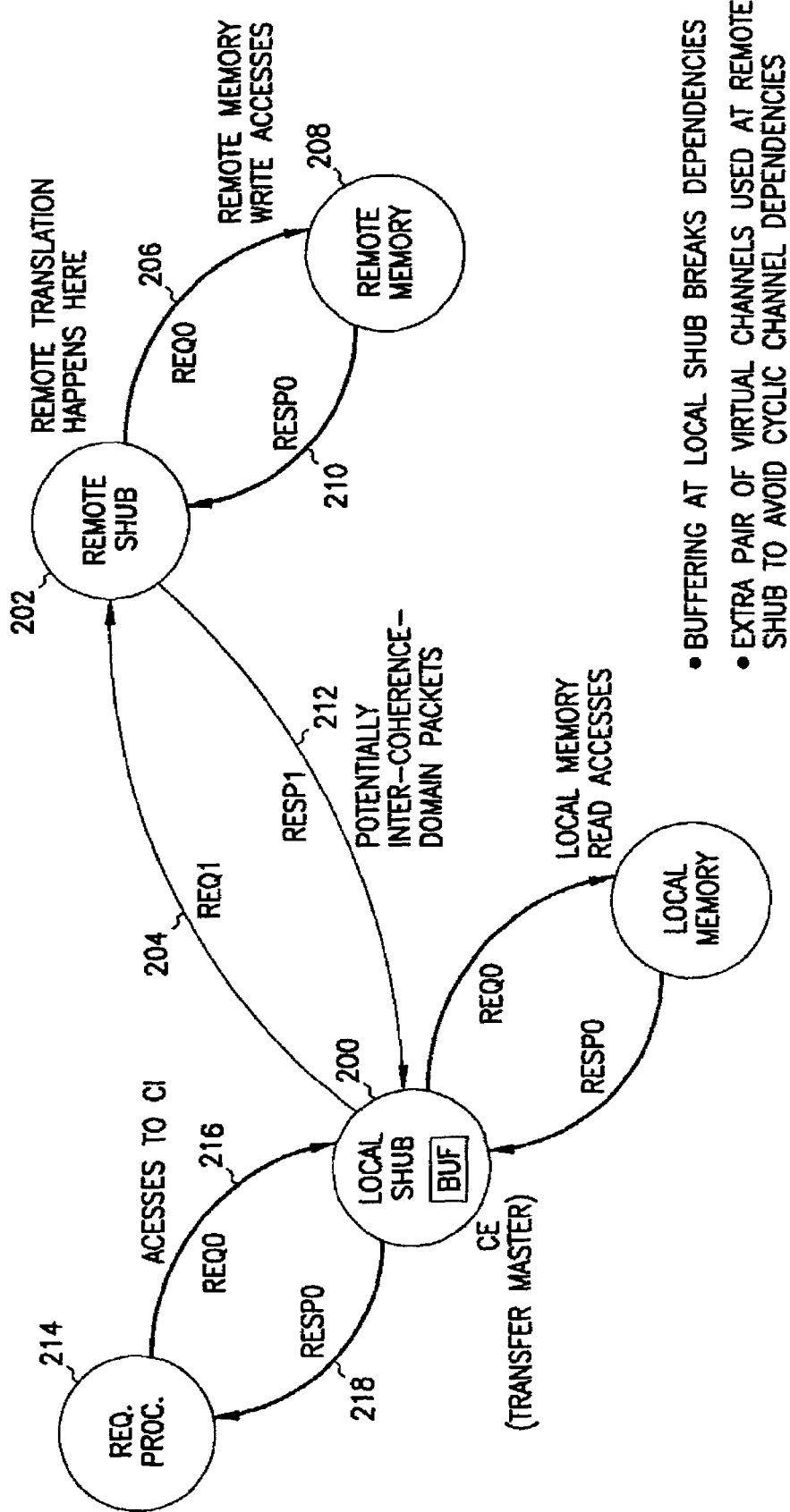
FIG. 6 illustrates the virtual channel dependencies involved in a block transfer between a local source memory buffer and a remote destination memory buffer, with the REQ0 and RESP0 virtual channels being assigned to normal memory traffic, and the REQ1 and RESP1 virtual channels being assigned to packets that require forwarding.

Referring to FIG. 6, the virtual channel dependencies involved in a block transfer between a local source memory buffer and a remote destination memory buffer, using the above-discussed virtual channel assignments, are illustrated. The packets sent from the local (master) SHUB 200 to the remote (slave) SHUB 202 use the REQ1 virtual channel 204, and are switched to the REQ0 virtual channel 206 after translation before being sent to the remote memory 208. The response packets sent from the remote memory 208 to the remote SHUB 202 use the RESP0 virtual channel 210, and are switched to the RESP1 virtual channel 212 before being forwarded to the local SHUB 200. Communications between the requesting processor 214 and the CI (if they are on different SHUBs) takes place using the REQ0 and RESP0 virtual channels 216 and 218. Since requests to the CI can be sunk independently of the CE's ability to make any forward progress on any transfers, there are no dependencies between accesses to the CI on REQ0 and packets sent by the CI on either REQ0 or REQ1. As the master CE makes local memory requests for the transfer, it allocates space to sink response packets. Thus, the load responses for the source memory (on RESP0) do not depend on the ability to send store requests to the remote SHUB (on REQ1). At the remote SHUB, incoming cluster request packets must be translated and potentially forwarded to other SHUBs within the remote coherence domain.

Since the remote SHUB does not have any buffering pre-allocated for incoming request packets, this forwarding creates virtual channel dependencies from REQ1→REQ0→RESP0 RESP1. No deadlock can occur, however, because these channel dependencies are acyclic. The REQ0/RESP0 transactions shown in FIG. 6 may involve nacks, retries and three-leg forwarding based upon the standard coherence protocol.

Since the remote SHUB can accept nacks for the request packets that it forwards, the remote SHUB allocates buffering for these packets at the time it performs the translation. The SHUB associated with the remote memory thus sends the response back through the remote SHUB (rather than performing three-hop forwarding) in order to clear up these buffer entries. This buffering could be used to allow the remote SHUB to accept memory response packets on RESP0, independent of its ability to send response packets to the mastering CE on RESP1, thus breaking the dependency between RESP0 and RESP1.

The remote SHUB keeps counters associated with the TLB for tracking outstanding requests. On a TLB shootdown event, the remote SHUB does not acknowledge completion of the shootdown until any currently outstanding requests that used the relevant TLB entry are completed. This may be done by coloring translated requests red or black and keeping a counter for each color. On a shootdown event, the active color for new requests is changed, and the shootdown acknowledge is delayed until the counter for the old color decrements to zero.

CONCLUSION

In the multiprocessor systems disclosed herein, intra-coherence and inter-coherence domain block transfers and AMOs appear the same from a software interface perspective. Since local memory and memory in another coherence domain are both accessed in the same way (i.e., via a CD), messaging software (e.g., MPI and shmem( ) software) can operate in the same manner when performing intra- and inter-coherence domain transfers. This eliminates the need for user/library software to know if the endpoint of a transfer or AMO address is in the same coherence domain. Thus, the multiprocessor appears very much like a single machine in terms of performance scaling and ease of programming applications. Various standard interfaces for cluster-based computing, such as ST and VIA, are also supported.

The address translation mechanism disclosed herein supports communication within a scalable multiprocessor, or across machine boundaries in a cluster, by performing local address translation using an external TLB in a local SHUB and remote address translation using an external TLB in a remote SHUB. This allows memory management to be performed local to the memory being accessed, and significantly reduces the amount of address translation information required at the source node for remote memory accesses (e.g., using this mechanism, it is not necessary for one OS image to be aware of the virtual-to-physical address translations used by the other OS images in the multiprocessor system). This reduction in the amount of address translation information required at the source node may be particularly advantageous in the larger multiprocessor systems that have large amount of memory and many processors. The disclosed address translation mechanism may be used by a communication engine for both local and remote accesses, thus allowing users to program the communication engine using virtual addresses. The ability to use virtual addresses to program the communication engine is advantageous since virtual addresses are more understandable to the user than physical addresses, and the user can perform block transfers and AMOs independently of the OS after initial setup (and can avoid the high overhead of the OS intervention needed by prior block transfer engines).

The CDs disclosed herein are handles used for translation and protection when communicating over virtual communication channels. The CDs abstract away whether the endpoint of a virtual connection is the local node, a remote node located on the local machine, or a remote node located on a different machine of a clustered system. The CDs provide user-level access to intra- and inter-machine communication facilities. The CDs also provide a mechanism for protection and can support remote address translation.

The above description is intended to be illustrative, and not restrictive. Many other embodiments will be apparent to those of ordinary skill in the art. For example, while the embodiments described above assume that the communication is being performed by a communication engine, the disclosed address translation mechanism could also be used with other forms of request generation. Also, while the CE disclosed herein is capable of performing both block transfers and AMOs, the address translation mechanism could also be applied to a communication engine capable of performing only a subset of these functions. The scope of the invention should therefore be determined with reference to the appended claims, along with the full scope of equivalents to which such claims are entitled.

What is claimed is:

1. A method of node translation for communicating over virtual channels in a clustered multiprocessor system, the clustered multiprocessor system including a plurality of processing element nodes including a local processing element node and a remote processing element node, and a network interconnect coupled between the processing element nodes for sending communications between the processing element nodes, wherein the local processing element node includes a processor and a communication engine, comprising:

assigning a connection descriptor to a virtual connection, the connection descriptor being a handle that specifies an endpoint node for the virtual connection;

defining a local connection table accessible by the communication engine, wherein the local connection table is configured to be accessed using the connection descriptor to produce a system node identifier for the endpoint node;

generating, within the processor, a communication request including the connection descriptor;

in response to the communication request, accessing, via the communication engine, the local connection table using the connection descriptor of the communication request to produce the system node identifier for the endpoint node for the virtual connection; and sending a memory request from the communication engine to the endpoint node, wherein the memory request is sent to the local processing element node if the endpoint node is the local processing element node, and is sent over the network interconnect to the remote processing element node if the endpoint node is the remote processing element node and wherein transfer of data associated with the memory request occurs independently of the processor that generated the communication request.

2. The method of claim 1, wherein assigning is performed by a local operating system in response to an operating system call by a local user process.

3. The method of claim 2, wherein assigning uses the connection descriptor to define a logical connection between a first virtual address space used by a local user process and a second virtual address space, whereby the connection descriptor allows the local user process to access the second virtual address space.

4. The method of claim 2, wherein defining is performed by the local operating system, which defines a local connection table for each user process.

5. The method of claim 1, wherein the local connection table includes a plurality of entries which are indexed by the connection descriptor, with each entry providing the system node identifier for the endpoint node of the associated virtual connection, and a key for qualifying an address translation at the endpoint node.

6. The method of claim 5, wherein each entry of the local connection table also includes a valid field for indicating whether the local connection table entry is valid.

7. The method of claim 1, wherein generating is performed by a local user process, which applies the communication request to the communication engine.

8. The method of claim 7, wherein accessing and sending are performed by the communication engine in response to the communication request.

9. The method of claim 5, wherein sending includes sending a virtual address and the key to the identified endpoint node, the address and key being for use in performing and qualifying address translation at the endpoint node.

10. The method of claim 1, wherein generating, accessing and sending are performed without intervention by an operating system.

11. The method of claim 1, wherein sending includes determining if a maximum number of outstanding packets has been reached.

12. A method of node translation for communicating over virtual channels in a clustered multiprocessor system, the clustered multiprocessor system including a plurality of processing element nodes, including a local processing element node and a remote processing element node, and a network interconnect coupled between the processing element nodes for sending communications between the processing element nodes, wherein the local processing element node includes a processor and a communication engine, comprising:
 assigning a first connection descriptor to a first virtual connection having a first endpoint node which is a local node on the local processing element node;
 assigning a second connection descriptor to a second virtual connection having a second endpoint node which is a remote node on the remote processing element node;
 defining a local connection table accessible by the communication engine, wherein the local connection table is configured to be accessed using the first and the second connection descriptors to produce a first and a second system node identifier for the first and the second endpoint nodes, respectively;
 generating, within the processor, a communication request including a target connection descriptor;
 in response to the communication request, accessing, via the communication engine, the local connection table to produce the first system node identifier if the target connection descriptor is the first connection descriptor, and to produce the second system node identifier if the target connection descriptor is the second connection descriptor; and
 sending a memory request from the communication engine to the endpoint node identified by accessing the local connection table, wherein transfer of data associated with the memory request occurs independently of the processor that generated the communication request.

13. The method of claim 12, wherein assigning the first and the second connection descriptors are performed by a local operating system in response to an operating system call.

14. The method of claim 13, wherein assigning the second connection descriptor uses the second connection descriptor to define a logical connection between a first virtual address space used by a local user process and a second virtual address space, whereby the second connection descriptor allows the local user process to access the second virtual address space.

15. The method of claim 13, wherein defining is also performed by the local operating system, which defines a local connection table for each user process.

16. The method of claim 12, wherein the local connection table includes a plurality of entries indexed by the connection descriptors, with each entry providing the system node identifier for the endpoint node of the associated virtual connection, and also providing a key for qualifying an address translation at the endpoint node.

17. The method of claim 16, wherein each entry of the local connection table also includes a valid field for indicating if that local connection table entry is valid.

18. The method of claim 12, wherein generating is performed by a local user process, which applies the communication request to the communication engine.

19. The method of claim 18, wherein accessing and sending are performed by the communication engine in response to the communication request.

20. The method of claim 16, wherein sending includes sending a virtual address and the key to the endpoint node of the identified virtual connection for use in performing and qualifying an address translation at the endpoint node.

21. The method of claim 12, wherein generating, accessing and sending are performed without intervention by an operating system.

22. In a clustered multiprocessor system including a plurality of processing element nodes, including a local processing element node and a remote processing element node, and a network interconnect coupled between the processing element nodes for sending communications between the processing element nodes, a node translation apparatus comprising:
 a memory configured to store a local connection table having a plurality of entries indexed by a connection descriptor, each entry of the local connection table storing a system node identifier for the endpoint of a virtual connection; and
 a communication engine connected to one or more processors in the local processing element node and configured to receive a communication request including a connection descriptor from a user process executing on one of the processors in the local processing element node, to access the local connection table using the connection descriptor of the communication request to produce the system node identifier for the endpoint node for the virtual connection, and to send a memory request to the endpoint node identified using the local connection table, wherein the memory request is sent internally to the endpoint node if the endpoint node is located within the local processing element node, and is sent over the network interconnect to the endpoint node if the endpoint node is located within the remote processing element node, wherein transfer of data associated with the memory request occurs independently of the processor that generated the communication request.

23. A clustered multiprocessor system, comprising:
 a plurality of processing element nodes, including a local processing element node and a remote processing element node;
 a network interconnect coupled between the processing element nodes for sending communications between the processing element nodes; and
 a node translation apparatus having:
  a memory configured to store a local connection table having a plurality of entries indexed by a connection descriptor, each entry of the local connection table storing a system node identifier for the endpoint of a virtual connection; and
  a communication engine connected to one or more processors in the local processing element node and configured to receive a communication request including a connection descriptor from a user process executing on one of the processors in the local processing element node, to access the local connection table using the connection descriptor of the communication request to produce the system node identifier for the endpoint node for the virtual connection, and to send a memory request to the endpoint node identified using the local connection table, wherein the memory request is sent internally to the endpoint node if the endpoint node is located within the local processing element node, and is sent over the network interconnect to the endpoint node if the endpoint node is located within the remote processing element node, wherein transfer of data associated with the memory request occurs independently of the processor that generated the communication request.

24. The clustered multiprocessor system of claim 23, wherein the network interconnect includes two request and two response virtual channels.

25. The clustered multiprocessor system of claim 23, wherein the remote node includes means for suppressing TLB miss servicing as a function of aging of outstanding packets.

26. The clustered multiprocessor system of claim 23, wherein each processing element node includes a communication engine, wherein address translation occurs within the communication engine.

27. The clustered multiprocessor system of claim 23, wherein a communication engine on one processing element node performs address translation for an address on another processing element node.

* * * * *